(12) United States Patent
Oohashi et al.

(10) Patent No.: US 6,661,146 B2
(45) Date of Patent: Dec. 9, 2003

(54) AUTOMOTIVE ALTERNATOR

(75) Inventors: Atsushi Oohashi, Tokyo (JP); Yoshihito Asao, Tokyo (JP)

(73) Assignee: Mitsubishi Denki Kabushiki Kaisha, Toyko (JP)

( * ) Notice: Subject to any disclaimer, the term of this patent is extended or adjusted under 35 U.S.C. 154(b) by 4 days.

(21) Appl. No.: 10/119,771

(22) Filed: Apr. 11, 2002

(65) Prior Publication Data

US 2002/0180299 A1 Dec. 5, 2002

(30) Foreign Application Priority Data

May 29, 2001 (JP) ........................................ 2001-160392

(51) Int. Cl.[7] ................................................ H02K 3/48
(52) U.S. Cl. ........................ 310/180; 310/179; 310/180; 310/184; 310/201
(58) Field of Search ................................ 310/179, 180, 310/184, 185

(56) References Cited

U.S. PATENT DOCUMENTS 5,177,388 A * 1/1993 Hotta ........................... 310/114
6,211,594 B1 * 4/2001 Umeda ........................ 310/180
6,396,185 B1 * 5/2002 Asao ........................... 310/180

FOREIGN PATENT DOCUMENTS

| JP | WO98/54822 | * 12/1998 | .......... H02K/19/22 |
| JP | 1128526 A | * 10/1999 | .......... H20K/19/24 |
| JP | 11-285216 | 10/1999 | |

* cited by examiner

*Primary Examiner*—Nestor Ramirez
*Assistant Examiner*—Iraj A. Mohandesi
(74) *Attorney, Agent, or Firm*—Sughrue Mion, PLLC

(57) ABSTRACT

A stator has a stator core provided with slots formed at a ratio of two per phase per pole and a stator winding composed of an a-phase, a d-phase, a c-phase, an f-phase, a b-phase, and an e-phase winding phase portions mounted to the stator core, wherein a'-phase winding phase portion is constructed by connecting the a-phase winding phase portion and the d-phase winding phase portion in series by a first interphase crossover portion, a b'-phase winding phase portion is constructed by connecting the b-phase winding phase portion and the e-phase winding phase portion in series by a second interphase crossover portion, and a c'-phase winding phase portion is constructed by connecting the c-phase winding phase portion and the f-phase winding phase portion in series by a third interphase crossover portion, the interphase crossover portions being arranged so as to be offset in a circumferential direction.

18 Claims, 21 Drawing Sheets

AUTOMOTIVE ALTERNATOR

This application is based on Application No. 2001-160392, filed in Japan on May 29, 2001, the contents of which are hereby incorporated by reference.

BACKGROUND OF THE INVENTION

1. Field of the Invention

The present invention relates to an automotive alternator provided with a stator in which a stator winding is installed in a stator core having two slots per phase per pole, and particularly relates to a stator construction in which a stator winding constructed by connecting together winding phase portions having a phase difference corresponding to an electrical angle of 30 degrees is installed.

2. Description of the Related Art

FIG. 24 is a longitudinal section showing a first conventional automotive alternator, FIG. 25 is a perspective showing a first stator used in the first conventional automotive alternator, and FIG. 26 is a circuit diagram showing an electric circuit in the first conventional automotive alternator.

In FIGS. 24 and 25, a first conventional automotive alternator includes: a case 3 constituted by a front bracket 1 and a rear bracket 2 made of aluminum; a shaft 6 disposed inside the case 3, a pulley 4 being secured to a first end portion of the shaft 6; a Lundell-type rotor 7 secured to the shaft 6; fans 5 secured to first and second axial end portions of the rotor 7; a first stator 8 secured to the case 3 so as to envelop the rotor 7; slip rings 9 secured to a second end portion of the shaft 6 for supplying electric current to the rotor 7; a pair of brushes 10 sliding on surfaces of the slip rings 9; a brush holder 11 for housing the brushes 10; first and second rectifiers 12A and 12B electrically connected to the first stator 8 for converting alternating current generated in the first stator 8 into direct current; and a regulator 18 mounted to a heat sink 17 fitted onto the brush holder 11, the regulator 18 adjusting the magnitude of the alternating voltage generated in the first stator 8.

The rotor 7 includes: a field winding 13 for generating magnetic flux on passage of an electric current; and a pair of first and second pole cores 20 and 21 disposed so as to cover the field winding 13, magnetic poles being formed in the first and second pole cores 20 and 21 by magnetic flux from the field winding. The first and second pole cores 20 and 21 are made of iron, each has six first and second claw-shaped magnetic poles 22 and 23 each having a generally trapezoidal outermost diameter surface shape disposed on an outer circumferential edge portion at even angular pitch in a circumferential direction so as to project axially, and the first and second pole cores 20 and 21 are fixed to the shaft 6 facing each other such that the first and second claw-shaped magnetic poles 22 and 23 intermesh. In other words, the number of magnetic poles in this rotor 7 is twelve.

The first stator 8 is constituted by: a cylindrical stator core 15 composed of a laminated body of magnetic plates; and a first stator winding 16 installed in the stator core 15.

The first stator 8 is held between the front bracket 1 and the rear bracket 2 so as to form a uniform air gap between outer circumferential surfaces of the claw-shaped magnetic poles 22 and 23 and an inner circumferential surface of the stator core 15. Seventy-two slots 15a opening onto an inner circumferential side are formed in the stator core 15 at an even angular pitch in a circumferential direction. In other words, the slots 15a are formed at a ratio of two per phase per pole, adjacent pairs of the slots 15a having a phase difference corresponding to an electrical angle of 30 degrees.

The first stator winding 16 is constituted by an a-phase winding phase portion 30a, a b-phase winding phase portion 30b, a c-phase winding phase portion 30c, a d-phase winding phase portion 30d, an e-phase winding phase portion 30e, and an f-phase winding phase portion 30f in each of which a continuous wire is installed in a wave shape in every sixth slot 15a. The a-phase winding phase portion 30a, the b-phase winding phase portion 30b, and the c-phase winding phase portion 30c are formed into a Y connection, constituting a first three-phase alternating current winding 160A, and the d-phase winding phase portion 30d, the e-phase winding phase portion 30e, and the f-phase winding phase portion 30f are formed into a Y connection, constituting a second three-phase alternating current winding 160B. The first and second three-phase alternating current windings 160A and 160B are connected to the first and second rectifiers 12A and 12B, respectively, constituting the electric circuit shown in FIG. 26.

A specific construction of the first stator winding 16 will now be explained with reference to FIGS. 27A to 28.

First, as shown in FIG. 27A, a first annular winding unit 33a is prepared by winding two conductor wires 32 each composed of a continuous copper wire having a circular cross section coated with an electrical insulator for a predetermined number of winds, and a second annular winding unit 33b is prepared by continuing to wind the two conductor wires 32 for a predetermined number of winds. Next, as shown in FIG. 27B, first and second intermediate star-shaped winding units 34A and 34B composed of two conductor wires are prepared by forming each of the first and second annular winding units 33a and 33b into a star shape in which adjacent pairs of slot-housed portions 34a are alternately joined on an inner circumferential side and an outer circumferential side by coil end portions 34b. Next, the first and second intermediate star-shaped winding units 34A and 34B are folded over at a linking portion of the conductor wires 32 where the first and second intermediate star-shaped winding units 34A and 34B are linked, and as shown in FIG. 27C, a star-shaped winding unit 35 is prepared by stacking the first and second intermediate star-shaped winding units 34A and 34B on top of one another such that the slot-housed portions 34a are superposed and the coil end portions 34b face each other in a radial direction.

A first star-shaped winding unit 35 prepared in this manner is mounted to the stator core 15 such that each of the slot-housed portions 34a is housed in Slot Numbers 1, 7, etc., through 67 of the slots 15a and such that the winding ends thereof extend outward from Slot Numbers 1 and 7 of the slots 15a, becoming the a-phase winding phase portion 30a. A second star-shaped winding unit 35 is mounted to the stator core 15 such that each of the slot-housed portions 34a is housed in Slot Numbers 2, 8, etc., through 68 of the slots 15a and such that the winding ends thereof extend outward from Slot Numbers 38 and 44 of the slots 15a, becoming the d-phase winding phase portion 30d. A third star-shaped winding unit 35 is mounted to the stator core 15 such that each of the slot-housed portions 34a is housed in Slot Numbers 3, 9, etc., through 69 of the slots 15a and such that the winding ends thereof extend outward from Slot Numbers 15 and 21 of the slots 15a, becoming the c-phase winding phase portion 30c. A fourth star-shaped winding unit 35 is mounted to the stator core 15 such that each of the slot-housed portions 34a is housed in Slot Numbers 4, 10, etc., through 70 of the slots 15a and such that the winding ends thereof extend outward from Slot Numbers 28 and 34 of the slots 15a, becoming the f-phase winding phase portion 30f. A fifth star-shaped winding unit 35 is mounted to the stator core 15 such that each of the slot-housed portions 34a is housed in Slot Numbers 5, 11, etc., through 71 of the slots 15a and such that the winding ends thereof extend outward from Slot Numbers 5 and 11 of the slots 15a, becoming the b-phase winding phase portion 30b. And a sixth star-shaped winding unit 35 is mounted to the stator core 15 such that each of the slot-housed portions 34a is housed in Slot Numbers 6, 12, etc., through 72 of the slots 15a and such that the winding ends thereof extend outward from Slot Numbers 24 and 30 of the slots 15a, becoming the e-phase winding phase portion 30e.

As shown in FIG. 28, the winding end of the a-phase winding phase portion 30a extending outward from Slot Number 7 of the slots 15a, the winding end of the b-phase winding phase portion 30b extending outward from Slot Number 11 of the slots 15a, and the winding end of the c-phase winding phase portion 30c extending outward from Slot Number 15 of the slots 15a are led around an upper portion of the coil end portions 34b (axially outside the stator core 15), gathered together, and integrated by a crimp 31. Here, the electrically-insulating coating on the winding end of each of the conductor wires 32 is removed and the winding ends of the conductor wires 32 are electrically connected by solder to constitute a neutral point N. Hence, the first three-phase alternating-current winding 160A is obtained, in which the a-phase winding phase portion 30a, the b-phase winding phase portion 30b, and the c-phase winding phase portion 30c are formed into a Y connection.

The winding end of the d-phase winding phase portion 30d extending outward from Slot Number 38 of the slots 15a, the winding end of the e-phase winding phase portion 30e extending outward from Slot Number 30 of the slots 15a, and the winding end of the f-phase winding phase portion 30f extending outward from Slot Number 34 of the slots 15a are led around an upper portion of the coil end portions 34b, gathered together, and integrated by a crimp 31. Here, the electrically-insulating coating on the winding end of each of the conductor wires 32 is removed and the winding ends of the conductor wires 32 are electrically connected by solder to constitute a neutral point N. Hence, the second three-phase alternating-current winding 160B is obtained, in which the d-phase winding phase portion 30d, the e-phase winding phase portion 30e, and the f-phase winding phase portion 30f are formed into a Y connection.

Here, the remaining winding ends of the a-phase winding phase portion 30a, the b-phase winding phase portion 30b, and the c-phase winding phase portion 30c constitute output wires Oa, Ob, and Oc, respectively, and the remaining winding ends of the d-phase winding phase portion 30d, the e-phase winding phase portion 30e, and the f-phase winding phase portion 30f constitute output wires Od, Oe, and Of, respectively. The output wires Oa, Ob, and Oc are connected to the first rectifier 12A and the output wires Od, Oe, and Of are connected to the second rectifier 12B to constitute the circuit shown in FIG. 26.

Moreover, because two conductor wires 32 are installed together, the a-phase winding phase portion 30a is constructed such that windings having the same number of turns are connected in parallel. The a-phase winding phase portion 30a is installed such that bundles of the conductor wires 32 extending outward from any given slot 15a are distributed half each to first and second circumferential sides. The rest of the winding phase portions 30b, 30c, 30d, 30e, and 30f are constructed in a similar manner.

The a-phase, b-phase, and c-phase winding phase portions 30a, 30b, and 30c are each given a phase difference corresponding to an electrical angle of 120 degrees, and the d-phase, e-phase, and f-phase winding phase portions 30d, 30e, and 30f are each given a phase difference corresponding to an electrical angle of 120 degrees. In addition, the d-phase, e-phase, and f-phase winding phase portions 30d, 30e, and 30f are given a phase difference corresponding to an electrical angle of 30 degrees relative to the a-phase, b-phase, and c-phase winding phase portions 30a, 30b, and 30c, respectively.

In the first conventional stator 8 constructed in this manner, the first stator winding 16 is constituted by the first and second three-phase alternating-current windings 160A and 160B, output from the first and second three-phase alternating current-windings 160A and 160B being rectified by the first and second rectifiers 12A and 12B. Thus, twelve diodes 12a are required to constitute the first and second rectifiers 12A and 12B, giving rise to cost increases. Because the first and second rectifiers 12A and 12B are positioned in ventilation channels for cooling airflows generated by the fans 5, ventilation resistance increases and the flow rates of the cooling airflows decrease, causing cooling of the first stator winding 16 to deteriorate. In addition, because the diodes 12a, which are heat-generating parts, are positioned at upstream ends of the ventilation channels for the cooling airflows, if the number of diodes 12a is increased, the cooling airflows supplied to cool the first stator winding 16 positioned downstream in the ventilation channels for the cooling airflows are heated, also causing cooling of the first stator winding 16 to deteriorate.

In order to solve problems of this kind, as shown in FIG. 29, it has been proposed that output from a second conventional stator winding 16A is rectified by a single rectifier 12C, the second conventional stator winding 16A being constructed such that an a'-phase winding phase portion 30a', a b'-phase winding phase portion 30b', and a c'-phase winding phase portion 30c' are prepared by connecting together in series those winding phase portions among the a-phase, b-phase, c-phase, d-phase, e-phase, and f-phase winding phase portions 30a, 30b, 30c, 30d, 30e, and 30f having a phase difference corresponding to an electrical angle of 30 degrees, and forming the a'-phase winding phase portion 30a', the b'-phase winding phase portion 30b', and the c'-phase winding phase portion 30c' into a Y connection to constitute a single three-phase alternating-current winding 160C.

A second stator 8A in which the second stator winding 16A is installed will now be explained with reference to FIGS. 30 and 31.

In the second stator 8A, the a-phase, b-phase, c-phase, d-phase, e-phase, and f-phase winding phase portions 30a, 30b, 30c, 30d, 30e, and 30f constituting the second stator winding 16A are constructed such that each of the slot-housed portions 34a of the star-shaped winding units 35 are housed in every sixth slot 15a in a similar manner to the first stator 8 described above.

The winding end of the a-phase winding phase portion 30a extending outward from Slot Number 7 of the slots 15a and the winding end of the d-phase winding phase portion 30d extending outward from Slot Number 38 of the slots 15a are led around an upper portion of the coil end portions 34b (axially outside the stator core 15), gathered together, and integrated by a crimp 31. Here, the electrically-insulating coating on the winding end of each of the conductor wires 32 is removed and the winding ends of the conductor wires 32 are electrically connected by solder. Hence, the a'-phase winding phase portion 30a' is constructed, in which the a-phase winding phase portion 30a and the d-phase winding phase portion 30d, which have a phase difference corresponding to an electrical angle of 30 degrees, are connected in series.

The winding end of the b-phase winding phase portion 30b extending outward from Slot Number 11 of the slots 15a and the winding end of the e-phase winding phase portion 30e extending outward from Slot Number 30 of the slots 15a are led around an upper portion of the coil end portions 34b (axially outside the stator core 15), gathered together, integrated by a crimp 31, and electrically connected by solder. Hence, the b'-phase winding phase portion 30b' is constructed, in which the b-phase winding phase portion 30b and the e-phase winding phase portion 30e, which have a phase difference corresponding to an electrical angle of 30 degrees, are connected in series.

The winding end of the c-phase winding phase portion 30c extending outward from Slot Number 15 of the slots 15a and the winding end of the f-phase winding phase portion 30f extending outward from Slot Number 34 of the slots 15a are led around an upper portion of the coil end portions 34b (axially outside the stator core 15), gathered together, integrated by a crimp 31, and electrically connected by solder. Hence, the c'-phase winding phase portion 30c' is constructed, in which the c-phase winding phase portion 30c and the f-phase winding phase portion 30f, which have a phase difference corresponding to an electrical angle of 30 degrees, are connected in series.

Next, the winding end of the d-phase winding phase portion 30d extending outward from Slot Number 44 of the slots 15a, the winding end of the e-phase winding phase portion 30e extending outward from Slot Number 24 of the slots 15a, and the winding end of the f-phase winding phase portion 30f extending outward from Slot Number 28 of the slots 15a are led around an upper portion of the coil end portions 34b, gathered together, integrated by a crimp 31, and electrically connected by solder. Hence, the single three-phase alternating-current winding 160C (the second stator winding 16A) is obtained, in which the a'-phase winding phase portion 30a', the b'-phase winding phase portion 30b', and the c'-phase winding phase portion 30c' are formed into a Y connection.

In the second stator 8A constructed in this manner, as shown in FIG. 31, a first interphase crossover portion $36_{a-d}$ which is constituted by the winding ends of the a-phase winding phase portion 30a and the d-phase winding phase portion 30d, a second interphase crossover portion $36_{b-e}$ which is constituted by the winding ends of the b-phase winding phase portion 30b and the e-phase winding phase portion 30e, and a third interphase crossover portion $36_{c-f}$ which is constituted by the winding ends of the c-phase winding phase portion 30c and the f-phase winding phase portion 30f are arranged so as to overlap in a radial direction of the stator core 15. A neutral-point connection portion 37 constituted by the winding ends of the d-phase winding phase portion 30d, the e-phase winding phase portion 30e and the f-phase winding phase portion 30f also overlaps the interphase crossover portions $36_{a-d}$, $36_{b-e}$, and $36_{c-f}$ in a radial direction. The remaining winding ends of the a-phase winding phase portion 30a, the b-phase winding phase portion 30b, and the c-phase winding phase portion 30c constitute output wires Oa', Ob', and Oc' of the a'-phase winding phase portion 30a', the b'-phase winding phase portion 30b', and the c'-phase winding phase portion 30c', respectively, and the joint portion of the neutral-point connection portion 37 constitutes a neutral point N. The output wires Oa', Ob', and Oc' are connected to the single rectifier 12C, constituting the circuit shown in FIG. 29.

In the first stator 8 used in the conventional automotive alternator, as described above, the first stator winding 16 is constituted by the first and second three-phase alternating-current windings 160A and 160B, output from the first and second three-phase alternating current-windings 160A and 160B being rectified by the first and second rectifiers 12A and 12B. Thus, one problem has been that the number of diodes 12a constituting the first and second rectifiers 12A and 12B is increased, giving rise to cost increases. Because ventilation resistance in the ventilation channels for the cooling airflows generated by the fans 5 increases, reducing the flow rates of the cooling airflows, and the cooling airflows supplied to cool the first stator winding 16 are heated by the heat from the diodes 12, another problem has been that cooling of the first stator winding 16 deteriorates.

In the second stator 8A used in the conventional automotive alternator, the problems with the first stator 8 described above are solved by constituting the second stator winding 16A by the single three-phase alternating-current winding 160C. However, because the interphase crossover portions $36_{a-d}$, $36_{b-e}$, and $36_{c-f}$ are arranged so as to overlap in a radial direction of the stator core 15, the following new problems have arisen.

The crossover portions on the radial outside among the interphase crossover portions $36_{a-d}$, $36_{b-e}$, and $36_{c-f}$ are less likely to be exposed to the cooling airflows and the stator winding 16A is not cooled efficiently, preventing the suppression of temperature increases in the second stator 8A. As a result, declines occur in the output of the second stator 8A. This problem is further exacerbated because the neutral-point connection portion 37 overlaps the interphase crossover portions $36_{a-d}$, $36_{b-e}$, and $36_{c-f}$ in a radial direction.

Now, it is also conceivable that the interphase crossover portions $36_{a-d}$, $36_{b-e}$, and $36_{c-f}$ could be exposed to the cooling airflows by varying the axial heights of the interphase crossover portions $36_{a-d}$, $36_{b-e}$, and $36_{c-f}$. In that case, because the axial heights of the interphase crossover portions $36_{a-d}$, $36_{b-e}$, and $36_{c-f}$ are higher, ventilation resistance increases, and wind noise also increases.

Because the crimps 31 (joint portions) of the interphase crossover portions $36_{a-d}$, $36_{b-e}$, and $36_{c-f}$ are in close proximity and short-circuiting between the crimps 31 occurs easily as a result of vibration, etc., electrical insulation deteriorates. This problem is further exacerbated because the joint portion of the neutral-point connection portion 37 is in close proximity to the joint portions of the interphase crossover portions $36_{a-d}$, $36_{b-e}$, and $36_{c-f}$.

SUMMARY OF THE INVENTION

The present invention aims to solve the above problems and an object of the present invention is to provide an automotive alternator enabling cooling and electrical insulation to be improved and wind noise to be reduced by making interphase connections between winding phase portions having a phase difference corresponding to an electrical angle of 30 degrees among six winding phase portions installed in a stator core in which slots are formed at a ratio of two per phase per pole so that output from a stator winding can be rectified by a single rectifier, and disposing the interphase crossover portions connecting the winding phase portions having a phase difference corresponding to an electrical angle of 30 degrees so as to be offset in a circumferential direction from each other.

To attain the above object, according to one aspect of the present invention, there is provided an automotive alternator including a stator having, an annular stator core in which slots are disposed at a ratio of two per phase per pole, and a stator winding mounted to the stator core. The stator winding is provided with six winding phase portions each installed in a slot group including every sixth slot of the slots such that each of the slot groups is successively offset by one slot. Each pair of the six winding phase portions having a phase difference corresponding to an electrical angle of approximately 30 degrees is connected by an interphase crossover portion. The interphase crossover portions are arranged so as to be separated in an axial direction from coil ends of the stator winding and so as to be offset in a circumferential direction so as not to overlap each other in a radial direction.

Therefore, there is provided an automotive alternator in which cooling and electrical insulation of the stator is improved and wind noise is reduced.

The stator winding may be constructed into a single three-phase alternating-current winding by forming three connected winding portions into a Y connection, each of the connected winding portions being formed by connecting a pair of the winding phase portions having a phase difference corresponding to an electrical angle of approximately 30 degrees by means of the interphase crossover portions. The stator winding may be constituted by first and second three-phase alternating-current windings in each of which three of the winding phase portions having a phase difference corresponding to an electrical angle of 120 degrees are formed into a Y connection, the first and second three-phase alternating-current windings being constructed in parallel by connecting pairs of the winding phase portions having a phase difference corresponding to an electrical angle of approximately 30 degrees by means of the interphase crossover portions. The stator winding may be constructed into a single three-phase alternating-current winding by forming three connected winding portions into a delta connection, each of the connected winding portions being formed by connecting a pair of the winding phase portions having a phase difference corresponding to an electrical angle of approximately 30 degrees by means of the interphase crossover portions. The interphase crossover portions may be constituted by continuous conductor wires coated with an electrical insulator. The interphase crossover portions may be constituted by conductor wires drawn in an axial direction from the winding phase portions and a connection member connecting the conductor wires at a position separated in an axial direction from the coil ends. The automotive alternator may include a rectifier for converting alternating current from the stator into direct current, the connection member being formed integrally in the rectifier so as not to overlap with a diode constituting the rectifier relative to a radial direction. The interphase crossover portions may have a joint portion formed by joining together end portions of conductor wires drawn from the winding phase portions, the joint portion being positioned in a ventilation channel for a cooling airflow above the coil ends. End portions of the conductor wires may be formed with a rectangular cross section, the end portions of the conductor wires being joined by bringing side surfaces constituted by long sides of the rectangular cross sections into close contact with each other. A neutral point constituting the three-phase alternating-current windings may be constituted by a joint portion formed by joining together end portions of conductor wires drawn from the winding phase portions, the joint portion being positioned in a ventilation channel for a cooling airflow above the coil ends. The joint portion may be formed by TIG welding. The interphase crossover portions may be disposed so as to be dispersed generally uniformly in a circumferential direction. Coil ends of the stator may be constructed in an aligned state in which coil end portions of the winding phase portions are arranged uniformly in a circumferential direction. The winding phase portions may be constructed by linking together a large number of short conductor segments. The winding phase portions may be constituted by a plurality of wave windings in each of which one continuous conductor wire is installed so as to alternately occupy an inner layer and an outer layer in every sixth slot of the slots. The winding phase portions may be constituted by conductor wires having a circular cross section. The winding phase portions may be connected in parallel by connecting radially-adjacent pairs of conductor wires at winding ends.

DETAILED DESCRIPTION OF THE PREFERRED EMBODIMENTS

The preferred embodiments of the present invention will now be explained with reference to the drawings.

Embodiment 1

Figure 1:
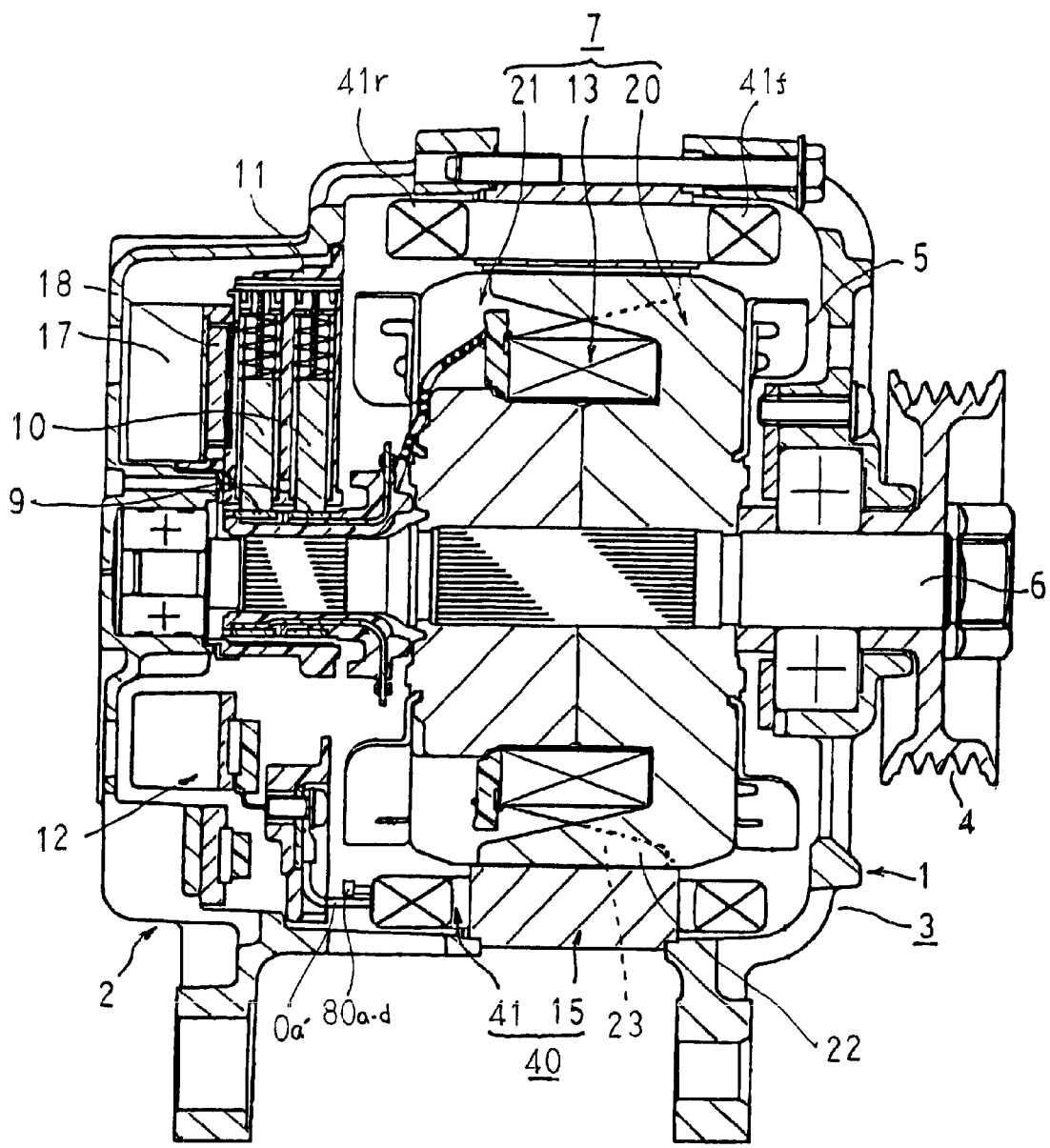
FIG. 1 is a longitudinal section showing an automotive alternator according to Embodiment 1 of the present invention.
Figure 2:
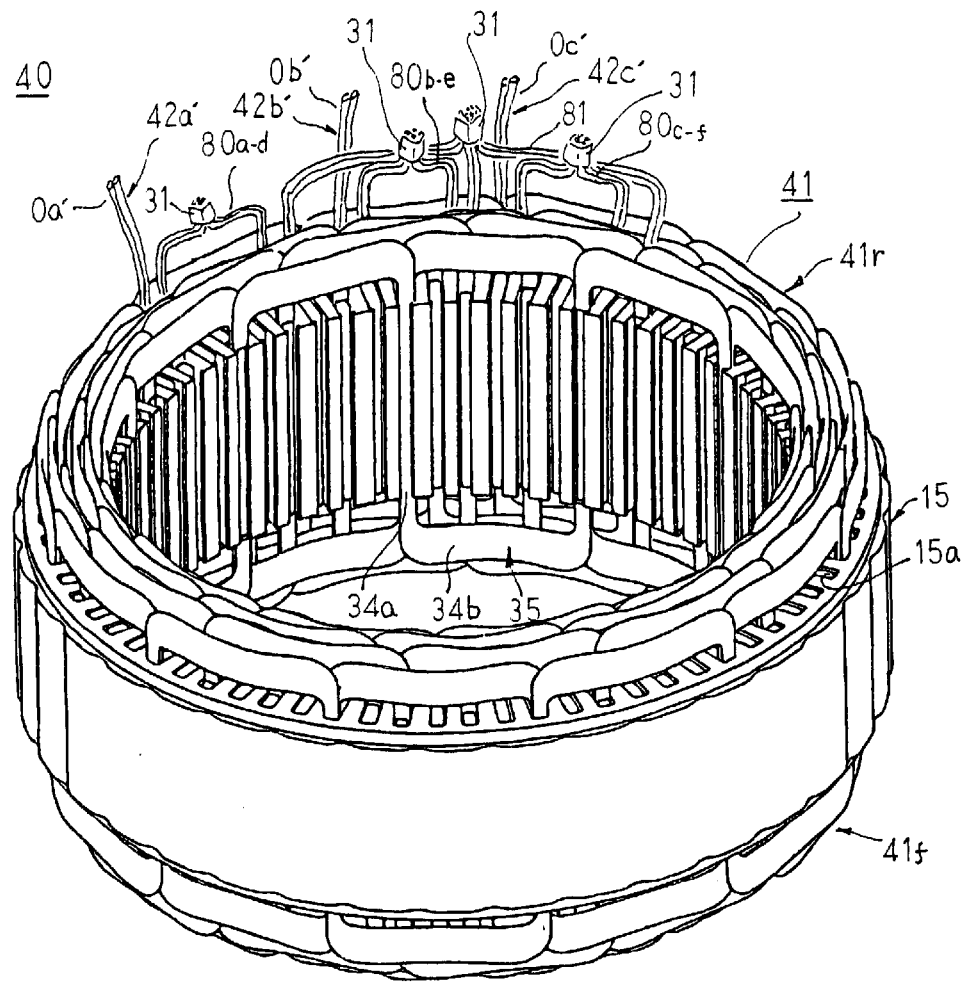
FIG. 2 is a perspective showing a stator of the automotive alternator according to Embodiment 1 of the present invention.
Figure 3:
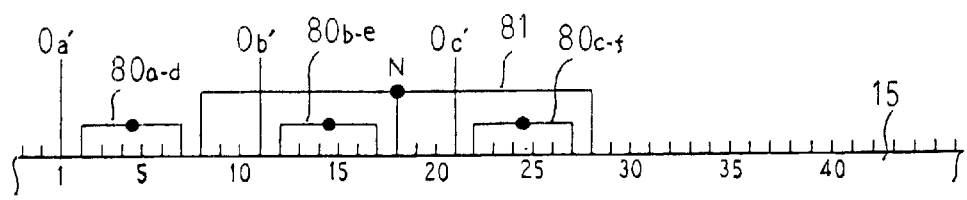
FIG. 3 is a schematic diagram explaining a method for connecting a stator winding in the stator of the automotive alternator according to Embodiment 1 of the present invention.
Figure 4:
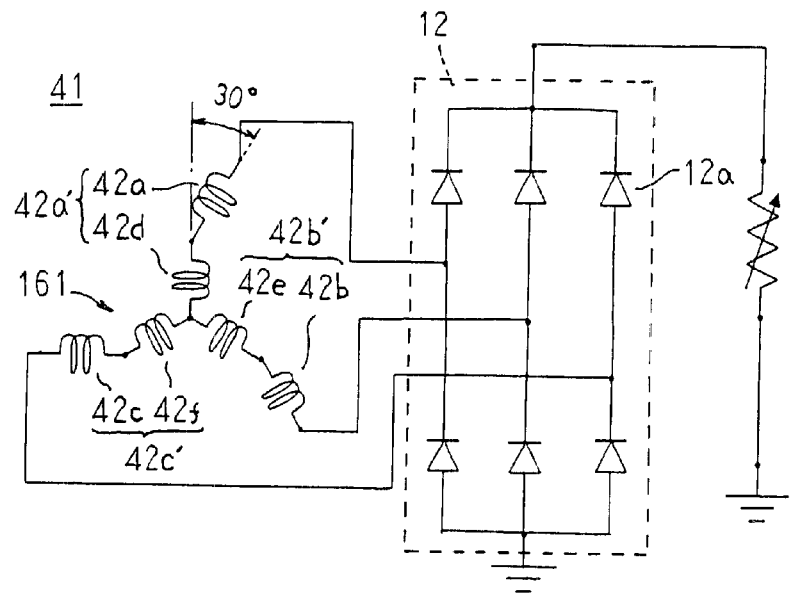
FIG. 4 is a circuit diagram showing an electric circuit in the automotive alternator according to Embodiment 1 of the present invention.

FIG. 1 is a longitudinal section showing an automotive alternator according to Embodiment 1 of the present invention, FIG. 2 is a perspective showing a stator of the automotive alternator according to Embodiment 1 of the present invention, FIG. 3 is a schematic diagram explaining a method for connecting a stator winding in the stator of the automotive alternator according to Embodiment 1 of the present invention, and FIG. 4 is a circuit diagram showing an electric circuit in the automotive alternator according to Embodiment 1 of the present invention. Moreover, in FIG. 3, the numerals 1, 5, etc., through 40 represent slot numbers. In each of the figures, portions the same as or corresponding to those in the conventional devices will be given the same numbering, and explanation thereof will be omitted.

Figure 24:
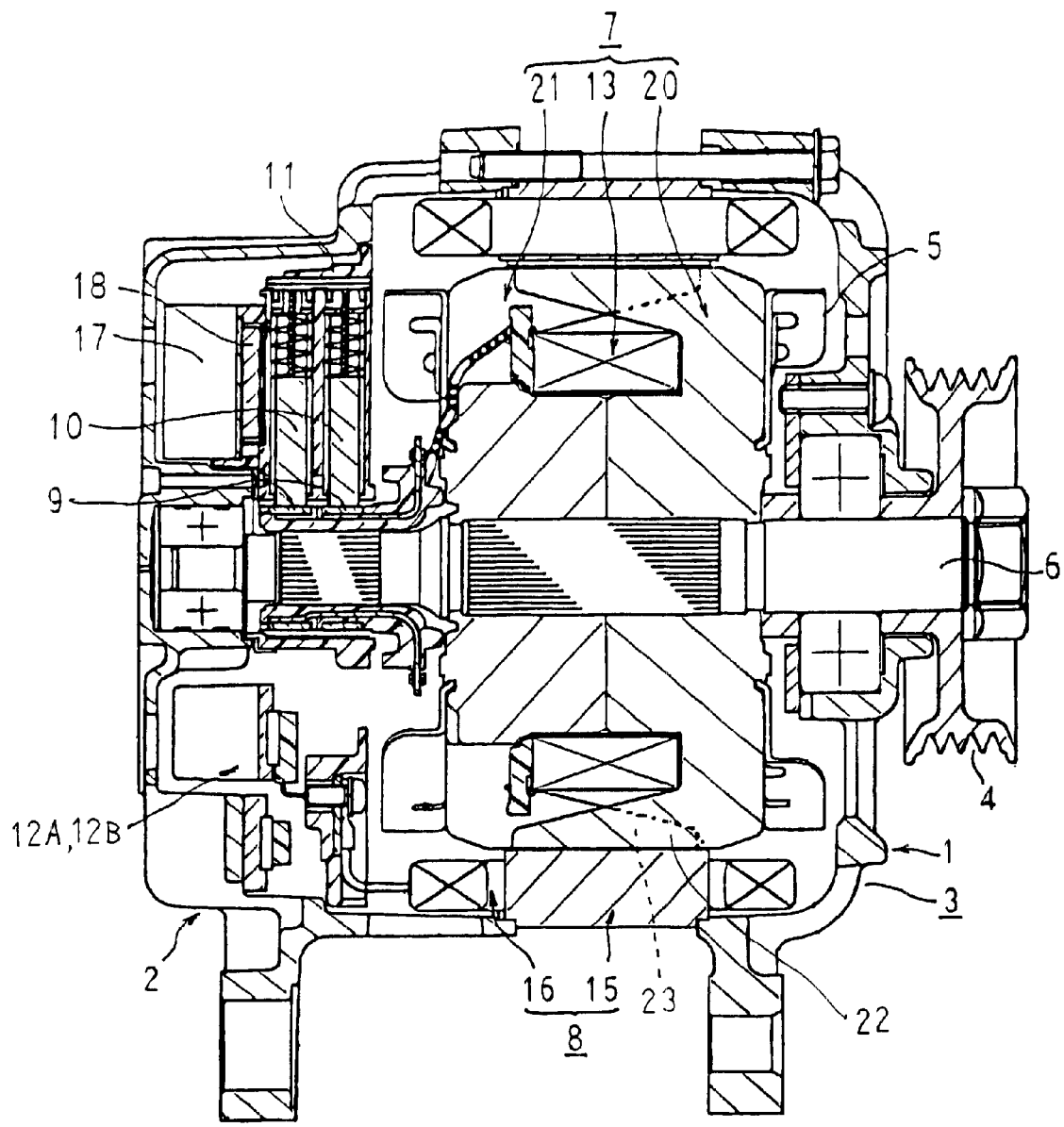
FIG. 24 is a longitudinal section showing a first conventional automotive alternator.
Figure 25:
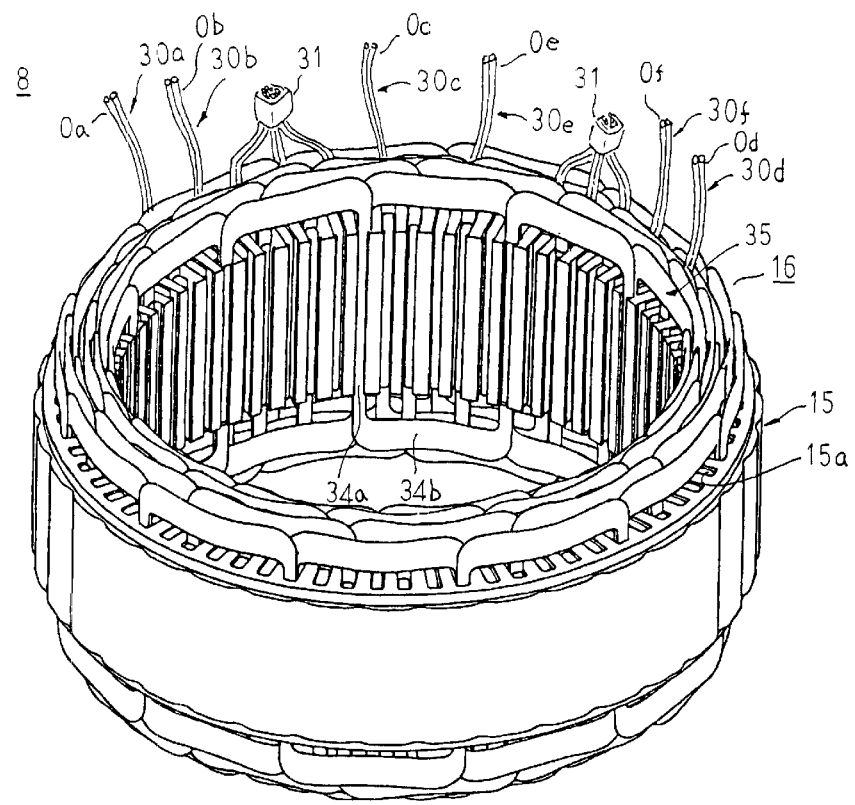
FIG. 25 is a perspective showing a first stator used in the first conventional automotive alternator.
Figure 26:
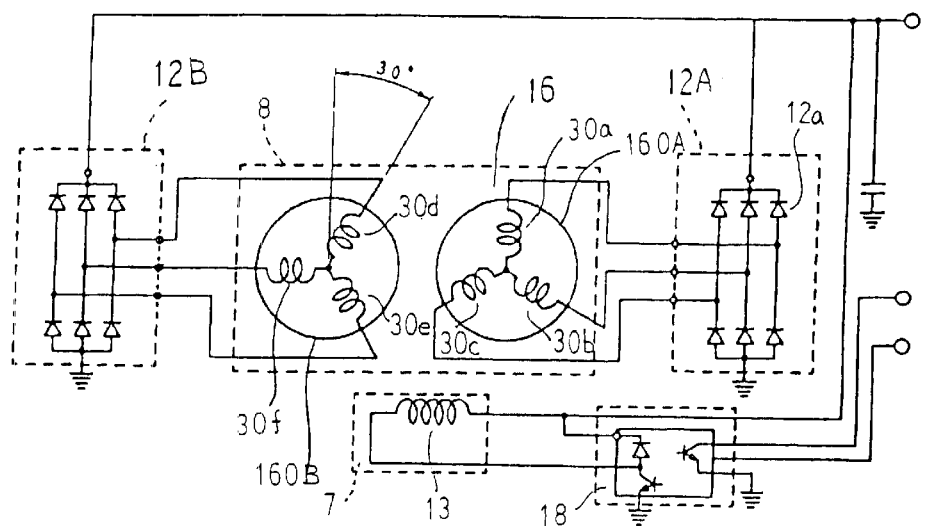
FIG. 26 is a circuit diagram showing an electric circuit in the first conventional automotive alternator.
Figure 27A:
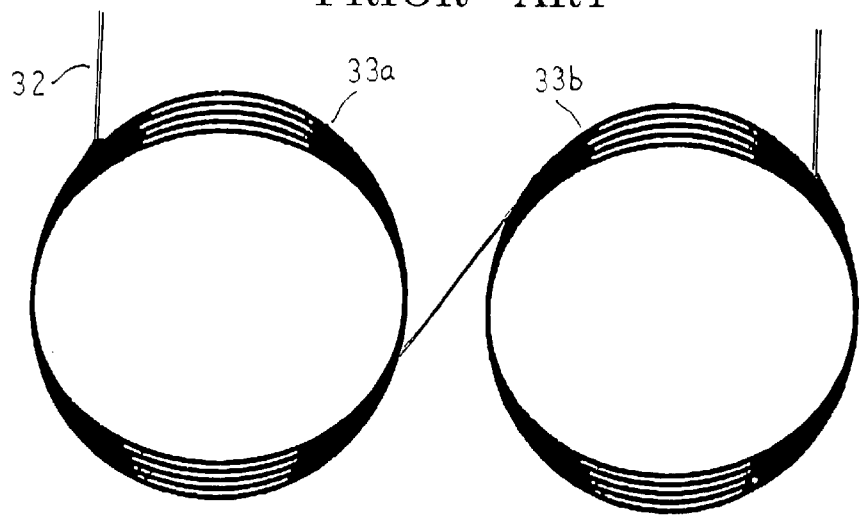
FIG. 27A is a diagram explaining a method for manufacturing a star-shaped winding unit constituting a first stator winding used in the first stator of the first conventional automotive alternator.
Figure 27B:
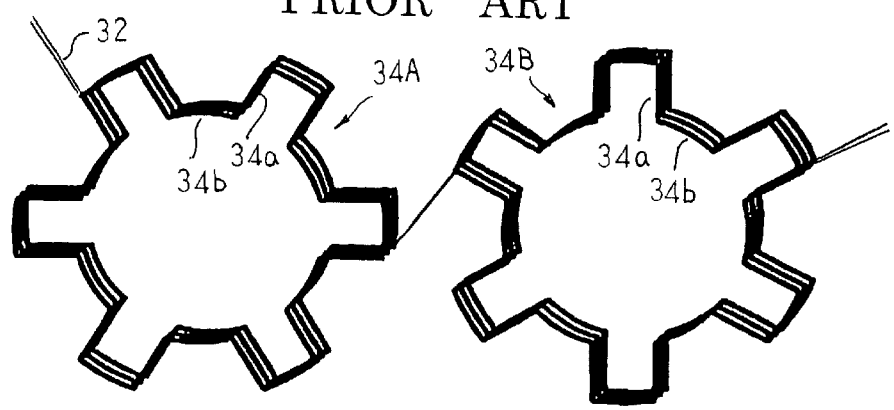
FIG. 27B is another diagram explaining the method for manufacturing the star-shaped winding unit constituting the first stator winding used in the first stator of the first conventional automotive alternator.
Figure 27C:
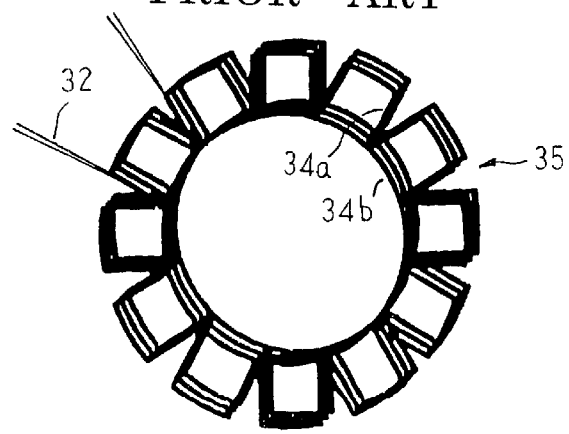
FIG. 27C is yet another diagram explaining the method for manufacturing the star-shaped winding unit constituting the first stator winding used in the first stator of the first conventional automotive alternator.
Figure 28:
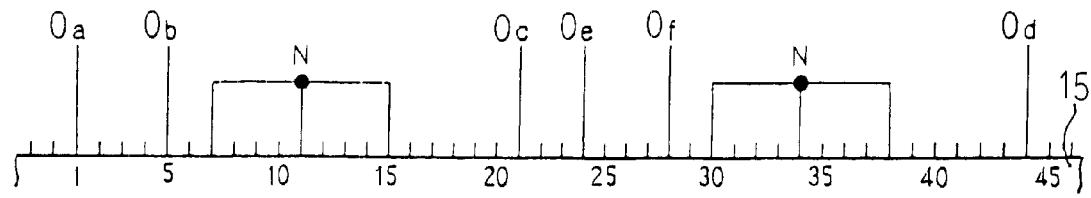
FIG. 28 is a schematic diagram explaining a method for connecting the first stator winding in the first stator of the first conventional automotive alternator.
Figure 29:
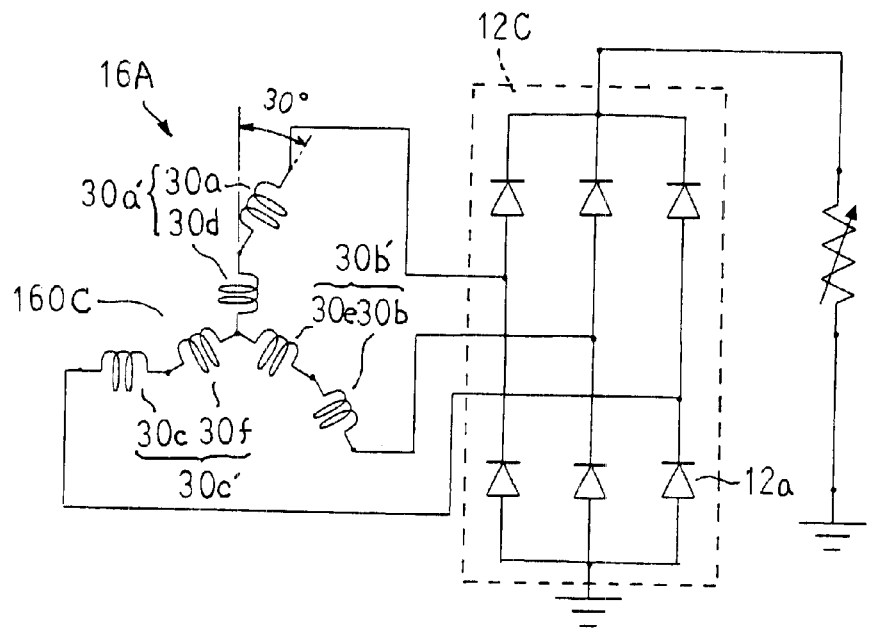
FIG. 29 is a circuit diagram showing an electric circuit in the second conventional automotive alternator.
Figure 30:
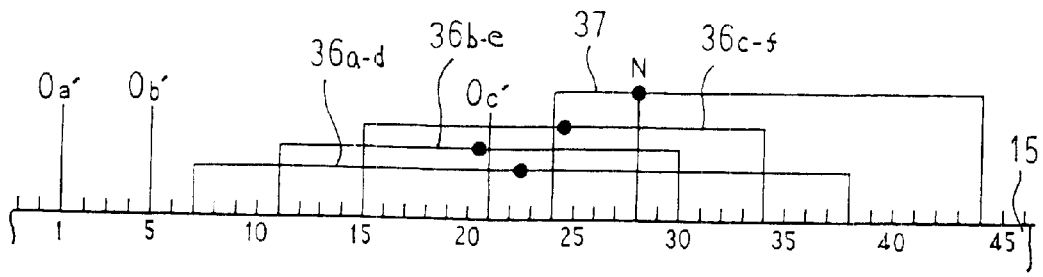
FIG. 30 is a schematic diagram explaining a method for connecting a second stator winding in a second stator of the second conventional automotive alternator.
Figure 31:
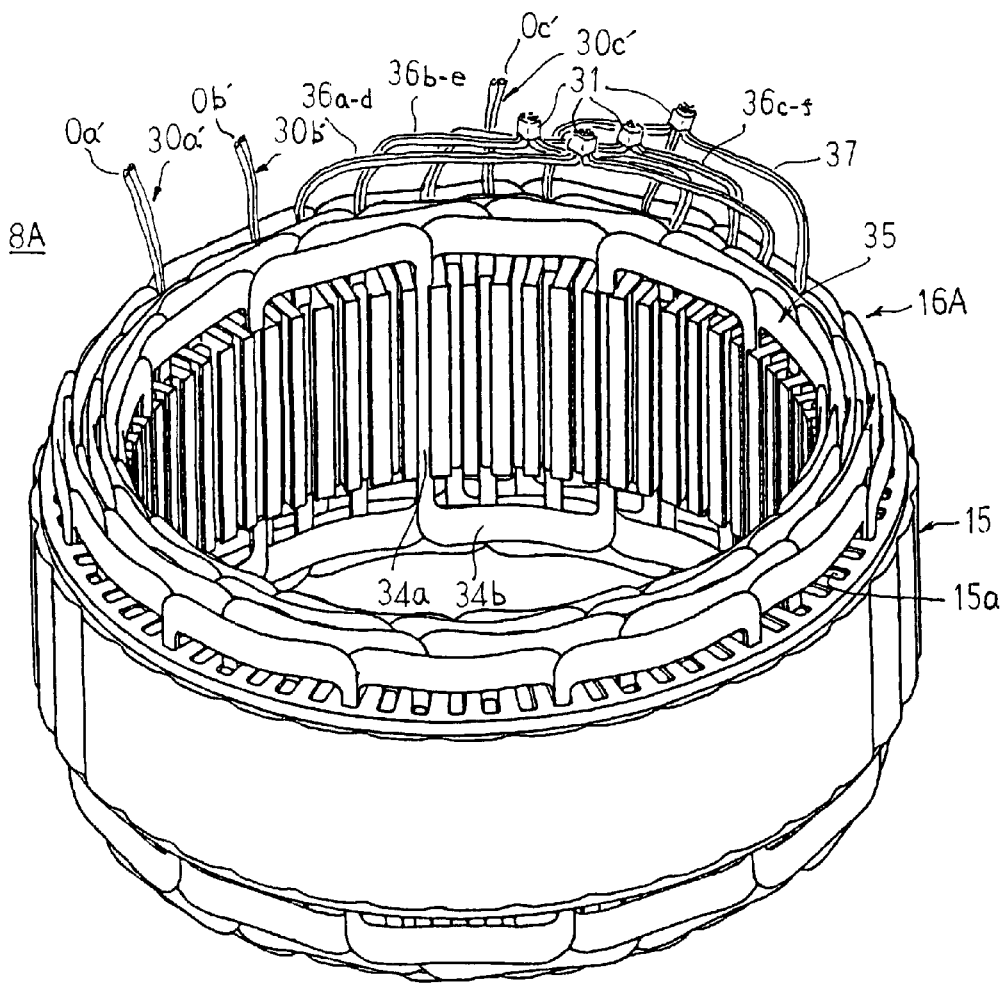
FIG. 31 is a perspective showing the second stator used in the second conventional automotive alternator.

The automotive alternator in FIG. 1 is constructed in a similar manner to the first conventional automotive alternator shown in FIG. 24 except for the fact that a stator 40, shown in FIG. 2, is used in place of the first stator 8, and a single rectifier 12 is provided to rectify output from the stator 40.

As shown in FIG. 2, this stator 40 is constituted by: a stator core 15; and a stator winding 41 installed in the stator core 15.

This stator winding 41 is constituted by an a-phase winding phase portion 42a, a b-phase winding phase portion 42b, a c-phase winding phase portion 42c, a d-phase winding phase portion 42d, an e-phase winding phase portion 42e, and an f-phase winding phase portion 42f.

The a-phase winding phase portion 42a is constructed by mounting a first star-shaped winding unit 35 to the stator core 15 such that each of the slot-housed portions 34a is housed in Slot Numbers 1, 7, etc., through 67 of the slots 15a and such that the winding ends thereof extend outward from Slot Numbers 1 and 7 of the slots 15a.

The d-phase winding phase portion 42d is constructed by mounting a second star-shaped winding unit 35 to the stator core 15 such that each of the slot-housed portions 34a is housed in Slot Numbers 2, 8, etc., through 68 of the slots 15a and such that the winding ends thereof extend outward from Slot Numbers 2 and 8 of the slots 15a.

The c-phase winding phase portion 42c is constructed by mounting a third star-shaped winding unit 35 to the stator core 15 such that each of the slot-housed portions 34a is housed in Slot Numbers 3, 9, etc., through 69 of the slots 15a and such that the winding ends thereof extend outward from Slot Numbers 21 and 27 of the slots 15a.

The f-phase winding phase portion 42f is constructed by mounting a fourth star-shaped winding unit 35 to the stator core 15 such that each of the slot-housed portions 34a is housed in Slot Numbers 4, 10, etc., through 70 of the slots 15a and such that the winding ends thereof extend outward from Slot Numbers 22 and 28 of the slots 15a.

The b-phase winding phase portion 42b is constructed by mounting a fifth star-shaped winding unit 35 to the stator core 15 such that each of the slot-housed portions 34a is housed in Slot Numbers 5, 11, etc., through 71 of the slots 15a and such that the winding ends thereof extend outward from Slot Numbers 11 and 17 of the slots 15a.

The e-phase winding phase portion 42e is constructed by mounting a sixth star-shaped winding unit 35 to the stator core 15 such that each of the slot-housed portions 34a is housed in Slot Numbers 6, 12, etc., through 72 of the slots 15a and such that the winding ends thereof extend outward from Slot Numbers 12 and 18 of the slots 15a.

As shown in FIG. 3, the winding end of the a-phase winding phase portion 42a extending outward from Slot Number 7 of the slots 15a and the winding end of the d-phase winding phase portion 42d extending outward from Slot Number 2 of the slots 15a are led around an upper portion of the coil end portions 34b (axially outside the stator core 15), gathered together, and integrated by a crimp 31. Here, the electrically-insulating coating on the winding end of each of the conductor wires 32 is removed and the winding ends of the conductor wires 32 are electrically connected by solder, constituting a first interphase crossover portion $80_{a-d}$. Hence, an a'-phase winding phase portion 42a' (a first connected winding portion) is formed, in which the a-phase winding phase portion 42a and the d-phase winding phase portion 42d are connected in series.

The winding end of the b-phase winding phase portion 42b extending outward from Slot Number 17 of the slots 15a and the winding end of the e-phase winding phase portion 42e extending outward from Slot Number 12 of the slots 15a are similarly led around an upper portion of the coil end portions 34b (axially outside the stator core 15), gathered together, integrated by a crimp 31, and electrically connected by solder, constituting a second interphase crossover portion $80_{b-e}$. Hence, a b'-phase winding phase portion 42b' (a second connected winding portion) is formed, in which the b-phase winding phase portion 42b and the e-phase winding phase portion 42e are connected in series.

The winding end of the c-phase winding phase portion 42c extending outward from Slot Number 27 of the slots 15a and the winding end of the f-phase winding phase portion 42f extending outward from Slot Number 22 of the slots 15a are similarly led around an upper portion of the coil end portions 34b (axially outside the stator core 15), gathered together, integrated by a crimp 31, and electrically connected by solder, constituting a third interphase crossover portion $80_{c-f}$. Hence, a c'-phase winding phase portion 42c' (a third connected winding portion) is formed, in which the c-phase winding phase portion 42c and the f-phase winding phase portion 42f are connected in series.

In addition, the winding end of the d-phase winding phase portion 42d extending outward from Slot Number 8 of the slots 15a, the winding end of the e-phase winding phase portion 42e extending outward from Slot Number 18 of the slots 15a, and the winding end of the f-phase winding phase portion 42f extending outward from Slot Number 28 of the slots 15a are similarly led around an upper portion of the coil end portions 34b, gathered together, integrated by a crimp 31, and electrically connected by solder, constituting a neutral-point connection portion 81. Hence, a three-phase alternating-current winding 161 is formed, in which the a'-phase winding phase portion 42a', the b'-phase winding phase portion 42b', and the c'-phase winding phase portion 42c' are formed into a Y connection.

Here, the remaining winding ends of the a-phase winding phase portion 42a, the b-phase winding phase portion 42b, and the c-phase winding phase portion 42c constitute output wires Oa', Ob', and Oc' of the a'-phase winding phase portion 42a', the b'-phase winding phase portion 42b', and c'-phase winding phase portion 42c', respectively. The joint portion of the neutral-point connection portion 81 constitutes a neutral point N.

The coil end portions 34b of each of the winding phase portions 42a, 42b, 42c, 42d, 42e, and 42f constitute front-end and rear-end coil ends 41f and 41r of the stator winding 41.

Moreover, because two conductor wires 32 are installed together, the a-phase winding phase portion 42a is constructed such that windings having the same number of turns are connected in parallel. The a-phase winding phase portion 42a is installed such that bundles of the conductor wires 32 extending outward from any given slot 15a are distributed half each to first and second circumferential sides. The rest of the winding phase portions 42b, 42c, 42d, 42e, and 42f are constructed in a similar manner.

The a-phase, b-phase, and c-phase winding phase portions 42a, 42b, and 42c are each given a phase difference corresponding to an electrical angle of 120 degrees, and the d-phase, e-phase, and f-phase winding phase portions 42d, 42e, and 42f are each given a phase difference corresponding to an electrical angle of 120 degrees. In addition, the d-phase, e-phase, and f-phase winding phase portions 42d, 42e, and 42f are given a phase difference corresponding to an electrical angle of 30 degrees relative to the a-phase, b-phase, and c-phase winding phase portions 42a, 42b, and 42c, respectively.

The output wires Oa', Ob', and Oc' of the stator 40 constructed in this manner are connected to the single rectifier 12, constituting the circuit shown in FIG. 4.

According to Embodiment 1, the interphase crossover portions $80_{a-d}$, $80_{b-e}$, and $80_{c-f}$ are arranged so as to be separated from each other in a circumferential direction, as shown in FIG. 2. Thus, the interphase crossover portions $80_{a-d}$, $80_{b-e}$, and $80_{c-f}$ are exposed to the cooling airflows, efficiently cooling the stator winding 41. Hence, temperature increases in the stator 40 are suppressed, achieving increased output in the stator 40.

Because there is no radial overlap between the interphase crossover portions $80_{a-d}$, $80_{b-e}$, and $80_{c-f}$, axial heights of the interphase crossover portions $80_{a-d}$, $80_{b-e}$, and $80_{c-f}$ can be lowered. Hence, ventilation resistance is reduced, enabling suppression of wind noise.

Because the crimps 31 (the joint portions) of the interphase crossover portions $80_{a-d}$, $80_{b-e}$, and $80_{c-f}$ are separated in a circumferential direction, short-circuiting among the crimps 31 resulting from vibrations is eliminated, enabling electrical insulation to be improved. Because the joint portion of the neutral-point connection portion 81 can be disposed so as to be separated in a circumferential direction from the joint portions of the interphase crossover portions $80_{a-d}$, $80_{b-e}$, and $80_{c-f}$, deterioration in electrical insulation is suppressed here also.

Because the stator winding 40 uses conductor wires 32 having a circular cross section, the cooling airflows flow over the upper portion (the axial outside) of the coil end portions 34b smoothly, improving cooling of the interphase crossover portions $80_{a-d}$, $80_{b-e}$, and $80_{e-f}$. In addition, damage to the electrically-insulating coating resulting from contact between the conductor wires 32 is suppressed, improving electrical insulation.

Because the neutral-point connection portion 81 is positioned on the upper portion of the coil end portions 34b, the cooling airflows contact the neutral-point connection portion 81 directly, suppressing temperature increases in the stator winding 41.

Because the stator winding 41 of this stator 40 is constituted by the single three-phase alternating-current winding 161, output from the stator winding 41 can be rectified by the single rectifier 12. Thus, the number of diodes 12a constituting the rectifier 12 is reduced, enabling cost reductions. Ventilation resistance in the ventilation channels for the cooling airflows generated by the fans 5 is reduced, increasing the flow rate of the cooling airflows. Similarly, the cooling airflows are supplied to cool the stator winding 41 without being heated excessively by the heat from the diodes 12a. Hence, cooling of the stator winding 41 is improved and temperature increases in the stator 40 are suppressed, achieving high output.

Moreover, in Embodiment 1 above, two conductor wires 32 are installed together in each of the winding phase portions, but similar effects are also exhibited if each of the winding phase portions of the stator are constructed by winding one strand of the conductor wire 32 for a predetermined number of winds. In each of the winding phase portions, bundles of conductor wires 32 extending outward from any given slot 15a are installed so as to be distributed half each to first and second circumferential sides, but similar effects are also exhibited if each of the winding phase portions of the stator is constructed by installing each of the winding phase portions such that the bundles of conductor wires 32 extending outward from any given slot 15a enter a slot 15a six slots away in one circumferential direction.

Figure 5:
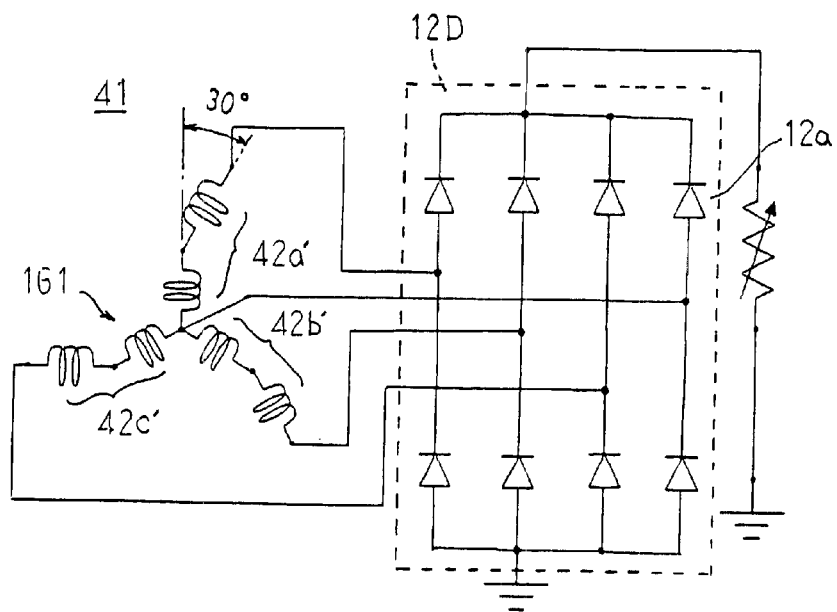
FIG. 5 is a circuit diagram showing an electric circuit of a variation of the automotive alternator according to Embodiment 1 of the present invention.

In Embodiment 1 above, a rectifier 12D including four diode bridges may also be used, the neutral point N of the stator winding 41 being connected to one of the diode bridges, as shown in FIG. 5. In that case, output can be extracted from the neutral point voltage of the three-phase alternating-current winding 161 efficiently in a high revolution region of the automotive alternator, enabling increased output.

Embodiment 2

Figure 6:
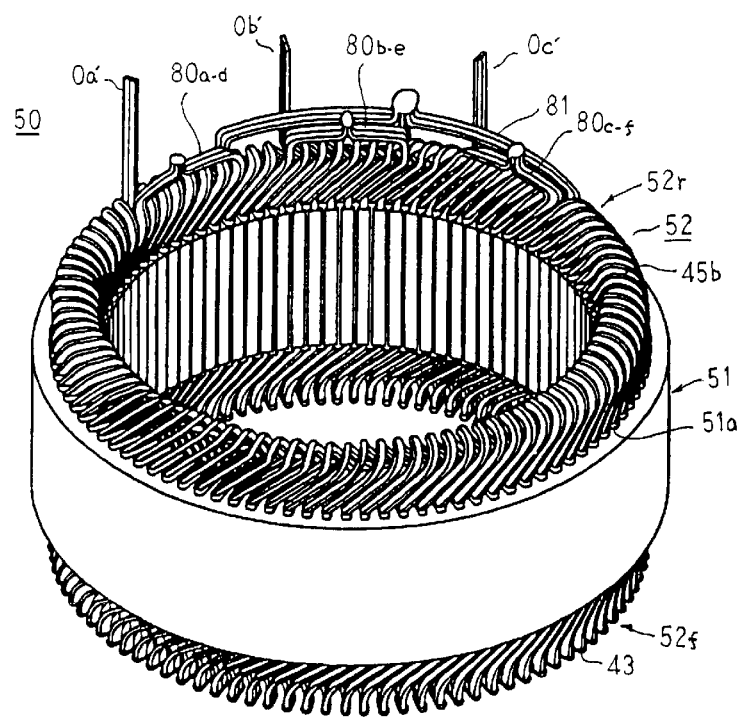
FIG. 6 is a perspective showing a stator of an automotive alternator according to Embodiment 2 of the present invention.
Figure 7:
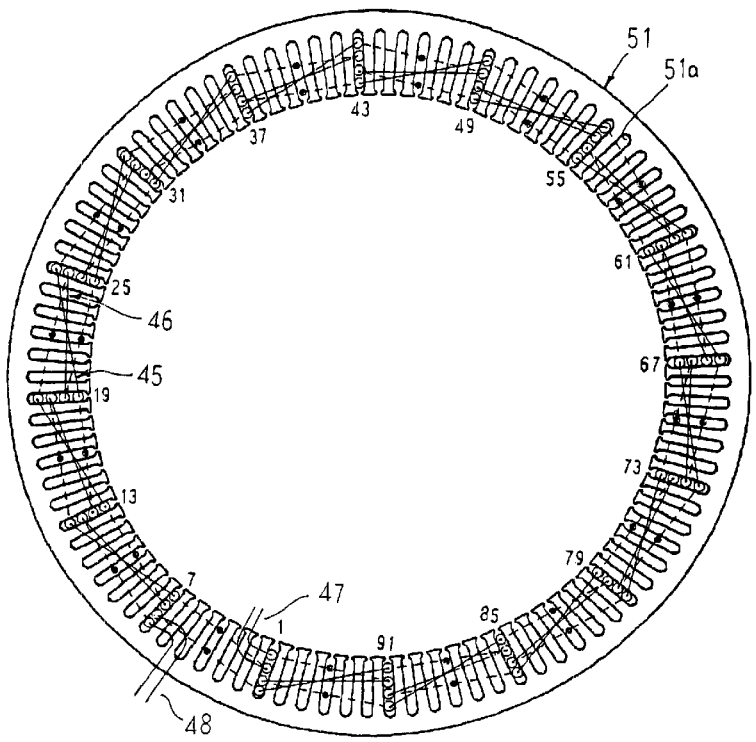
FIG. 7 is a rear end elevation explaining installation of a single winding phase portion constituting a stator winding of the automotive alternator according to Embodiment 2 of the present invention.
Figure 8:
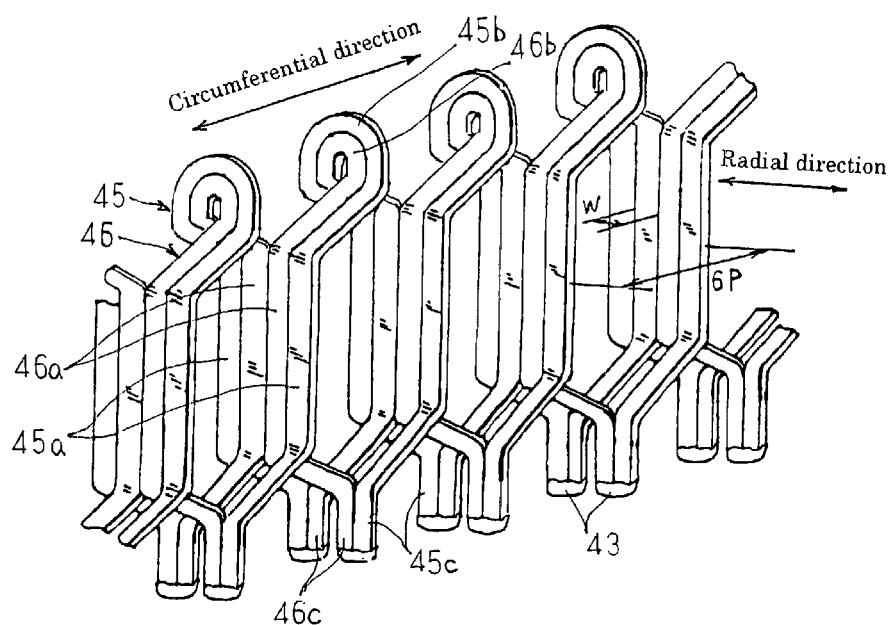
FIG. 8 is a partial perspective explaining a construction of the single winding phase portion in the stator winding of the automotive alternator according to Embodiment 2 of the present invention.
Figure 9:
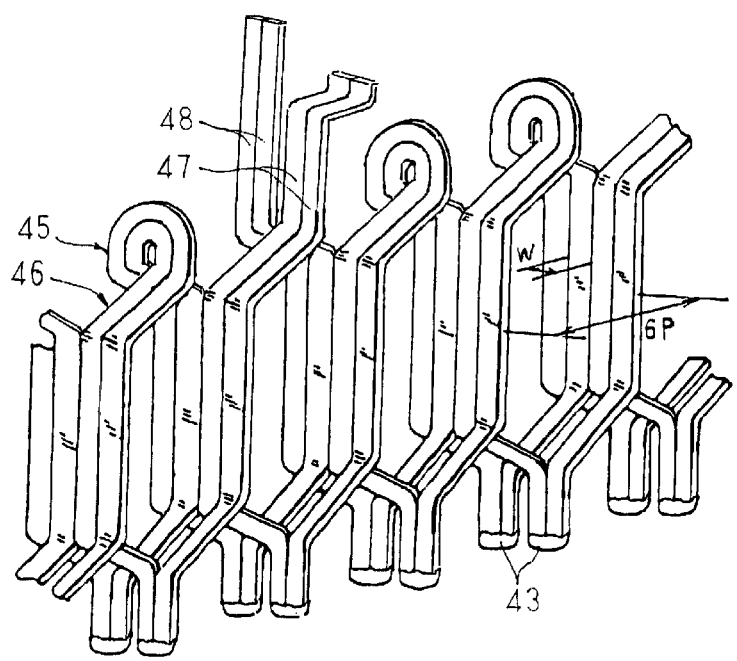
FIG. 9 is another partial perspective explaining the construction of the single winding phase portion in the stator winding of the automotive alternator according to Embodiment 2 of the present invention.
Figure 10:
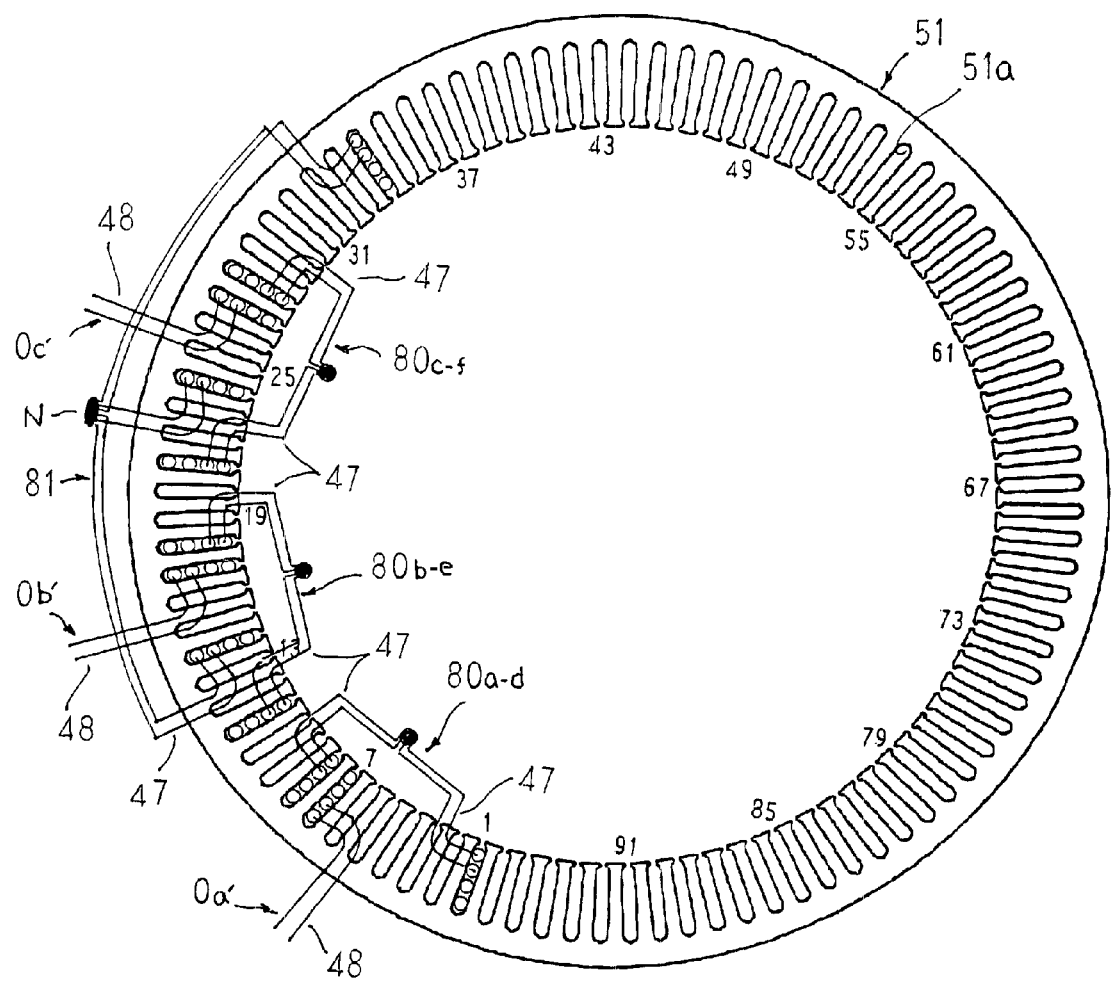
FIG. 10 is a rear end elevation explaining connections in the stator winding in the stator of the automotive alternator according to Embodiment 2 of the present invention.

FIG. 6 is a perspective showing a stator of an automotive alternator according to Embodiment 2 of the present invention, FIG. 7 is a rear end elevation explaining installation of a single winding phase portion constituting a stator winding of the automotive alternator according to Embodiment 2 of the present invention, FIGS. 8 and 9 are both partial perspectives explaining a construction of the single winding phase portion in the stator winding of the automotive alternator according to Embodiment 2 of the present invention, and FIG. 10 is a rear end elevation explaining connections in the stator winding in the stator of the automotive alternator according to Embodiment 2 of the present invention.

Moreover, in FIG. 7, solid lines indicate rear-end wiring, broken lines indicate front-end wiring, and black circles indicate joint portions.

In FIG. 6, a stator 50 is constituted by: a stator core 51 in which a laminated body of magnetic plates is formed into a cylindrical shape; and a stator winding 52 installed in the stator core 51.

Ninety-six slots 51a are formed in the stator core 51 at an even angular pitch in a circumferential direction so as to open onto an inner circumferential side. This stator 50 is mounted to an automotive alternator equipped with a rotor having sixteen magnetic poles, the slots 51a being formed at a ratio of two per phase per pole.

As described below, the stator winding 52 is constituted by a three-phase alternating-current winding in which an a'-phase winding phase portion (a first connected winding portion) in which an a-phase winding phase portion and a d-phase winding phase portion having a phase difference corresponding to an electrical angle of 30 degrees from each other are connected in series by a first interphase crossover portion $80_{a-d}$, a b'-phase winding phase portion (a second connected winding portion) in which a b-phase winding phase portion and an e-phase winding phase portion having a phase difference corresponding to an electrical angle of 30 degrees from each other are connected in series by a second interphase crossover portion $80_{b-e}$, and a c'-phase winding phase portion (a third connected winding portion) in which a c-phase winding phase portion and an f-phase winding phase portion having a phase difference corresponding to an electrical angle of 30 degrees from each other are connected in series by a third interphase crossover portion $80_{c-f}$ are formed into a Y connection (an alternating-current connection).

Next, a construction of a single winding phase portion constituting the stator winding 52 will be explained with reference to FIGS. 7 to 9.

A large conductor segment 45 is formed by bending a short length of copper wire having a rectangular cross section coated with an electrical insulator into a general U shape, being constructed such that a pair of large slot-housed portions 45a are joined by a generally V-shaped large return portion 45b.

A small conductor segment 46 is formed by bending a short length of copper wire having a rectangular cross section coated with an electrical insulator into a general U shape, being constructed such that a pair of small slot-housed portions 46a are joined by a generally V-shaped small return portion 46b.

Moreover, to facilitate explanation, Slot Numbers from 1 to 96 are allocated to each of the slots 51a, as shown in FIG. 7, and the positions in each of the slots 51a in which the slot-housed portions 45a and 46a of the conductor segments 45 and 46 are housed are designated Address 1, Address 2, Address 3, and Address 4, respectively, from an inner circumferential side.

The small conductor segments 46 are inserted from a rear end of the stator core 51 into slot pairs separated by six slots (slot pairs including Slot Numbers n and (n+6)). Here, in each of the slot pairs, the small conductor segments 46 are inserted into Address 2 in Slot Number n of the slots 51a and into Address 3 in Slot Number (n+6) of the slots 51a. Next, the large conductor segments 45 are inserted from a rear end of the stator core 51 into slot pairs separated by six slots (slot pairs including Slot Numbers n and (n+6)). Here, in each of the slot pairs, the large conductor segments 45 are inserted into Address 1 in Slot Number n of the slots 51a and into Address 4 in Slot Number (n+6) of the slots 51a.

Free end portions of the large conductor segments 45 and the small conductor segments 46 extending outward at the front end from Address 2 and Address 4 of each of the slot pairs are bent in a clockwise direction in FIG. 7, and free end portions of the large conductor segments 45 and the small conductor segments 46 extending outward at the front end from Address 1 and Address 3 of each of the slot pairs are bent in a counterclockwise direction in FIG. 7. Here, four slot-housed portions 45a and 46a are housed in each of the slots 51a so as to line up in one row in a radial direction.

Next, the free end portions 46c of the small conductor segments 46 extending outward at the front end from Address 2 in Slot Number n of the slots 51a and the free end portions 45c of the large conductor segments 45 extending outward at the front end from Address 1 in Slot Number (n+6) of the slots 51a are stacked in a radial direction and joined by tungsten-inert gas (TIG) welding. Similarly, the free end portions 45c of the large conductor segments 45 extending outward at the front end from Address 4 in Slot Number n of the slots 51a and the free end portions 46c of the small conductor segments 46 extending outward at the front end from Address 3 in Slot Number (n+6) of the slots 51a are stacked in a radial direction and joined by TIG welding. Hence, as shown in FIG. 7, two two-turn lap windings are formed, the lap windings being wound into every sixth slot 51a. These two lap windings correspond to the single winding phase portion.

Now, at the rear end of the stator core 51, coil end portions constructed into two layers such that the large return portions 45b surround the small return portions 46b are arranged in a circumferential direction at a pitch of six slots (6P), as shown in FIG. 8. On the other hand, at the front end of the stator core 15, joint portions 43 (coil end portions) of the free end portions 45c and 46c are arranged in a circumferential direction at a pitch of six slots so as to form two rows and so as to be separated and line up in single rows in a radial direction, as shown in FIG. 8.

First and second modified conductor segments 47 and 48 having a rectangular cross section are inserted only into Slot Number 1 and Slot Number 7 of the slots 51a, as shown in FIG. 9. The first modified conductor segments 47 are used for the interphase crossover connections and the neutral-point connections described below, and the second modified conductor segments 48 are used as output wires.

Moreover, in FIG. 7, only one single winding phase portion is installed in the stator core 51, but in reality, six single winding phase portions installed in this manner are installed such that the slot groups into which each is inserted are successively offset by one slot from each other. More specifically, an a-phase winding phase portion is installed in a first slot group including Slot Numbers 1, 7, etc., through 91, a d-phase winding phase portion is installed in a second slot group including Slot Numbers 2, 8, etc., through 92, a c-phase winding phase portion is installed in a third slot group including Slot Numbers 3, 9, etc., through 93, an f-phase winding phase portion is installed in a fourth slot group including Slot Numbers 4, 10, etc., through 94, a b-phase winding phase portion is installed in a fifth slot group including Slot Numbers 5, 11, etc., through 95, and an e-phase winding phase portion is installed in a sixth slot group including Slot Numbers 6, 12, etc., through 96.

The a-phase winding phase portion, the b-phase winding phase portion, and the c-phase winding phase portion have a phase difference corresponding to an electrical angle of 120 degrees from each other, and the d-phase winding phase portion, the e-phase winding phase portion, and the f-phase winding phase portion have a phase difference corresponding to an electrical angle of 120 degrees from each other. The d-phase winding phase portion, the e-phase winding phase portion, and the f-phase winding phase portion have a phase difference corresponding to an electrical angle of 30 degrees relative to the a-phase winding phase portion, the b-phase winding phase portion, and the c-phase winding phase portion, respectively.

End portions of the first modified conductor segments 47 extending outward at the rear end from Address 1 and Address 2 of Slot Number 1 of the slots 51a and end portions of the second modified conductor segments 48 extending outward at the rear end from Address 3 and Address 4 of Slot Number 7 of the slots 51a constitute winding ends of the a-phase winding phase portion. End portions of the first modified conductor segments 47 extending outward at the rear end from Address 1 and Address 2 of Slot Number 8 of the slots 51a and end portions of the first modified conductor segments 47 extending outward at the rear end from Address 3 and Address 4 of Slot Number 14 of the slots 51a constitute winding ends of the d-phase winding phase portion. End portions of the first modified conductor segments 47 extending outward at the rear end from Address 1 and Address 2 of Slot Number 11 of the slots 51a and end portions of the second modified conductor segments 48 extending outward at the rear end from Address 3 and Address 4 of Slot Number 17 of the slots 51a constitute winding ends of the b-phase winding phase portion. End portions of the first modified conductor segments 47 extending outward at the rear end from Address 1 and Address 2 of Slot Number 18 of the slots 51a and end portions of the first modified conductor segments 47 extending outward at the rear end from Address 3 and Address 4 of Slot Number 24 of the slots 51a constitute winding ends of the e-phase winding phase portion. End portions of the first modified conductor segments 47 extending outward at the rear end from Address 1 and Address 2 of Slot Number 21 of the slots 51a and end portions of the second modified conductor segments 48 extending outward at the rear end from Address 3 and Address 4 of Slot Number 27 of the slots 51a constitute winding ends of the c-phase winding phase portion. And end portions of the first modified conductor segments 47 extending outward at the rear end from Address 1 and Address 2 of Slot Number 28 of the slots 51a and end portions of the first modified conductor segments 47 extending outward at the rear end from Address 3 and Address 4 of Slot Number 34 of the slots 51a constitute winding ends of the f-phase winding phase portion.

Next, as shown in FIG. 10, the first modified conductor segments 47 extending outward at the rear end from Address 1 and Address 2 of Slot Number 1 of the slots 51a and the first modified conductor segments 47 extending outward at the rear end from Address 1 and Address 2 of Slot Number 8 of the slots 51a are led around an upper portion of the coil end portions (the return portions 45b and 46b), and the end portions of the first modified conductor segments 47 are abutted and joined together by TIG welding, constituting a first interphase crossover portion $80_{a\text{-}d}$. Hence, an a'-phase winding phase portion (a first connected winding portion) is formed, in which the a-phase winding phase portion and the d-phase winding phase portion are connected in series. The end portions of the first modified conductor segments 47 are welded by abutting together side surfaces constituted by long sides of the rectangular cross sections.

The first modified conductor segments 47 extending outward at the rear end from Address 1 and Address 2 of Slot Number 11 of the slots 51a and the first modified conductor segments 47 extending outward at the rear end from Address 1 and Address 2 of Slot Number 18 of the slots 51a are led around an upper portion of the coil end portions (the return portions 45b and 46b), and the end portions of the first modified conductor segments 47 are abutted and joined together by TIG welding, constituting a second interphase crossover portion $80_{b\text{-}e}$. Hence, a b'-phase winding phase portion (a second connected winding portion) is formed, in which the b-phase winding phase portion and the e-phase winding phase portion are connected in series. The end portions of the first modified conductor segments 47 are welded by abutting together side surfaces constituted by long sides of the rectangular cross sections.

The first modified conductor segments 47 extending outward at the rear end from Address 1 and Address 2 of Slot Number 21 of the slots 51a and the first modified conductor segments 47 extending outward at the rear end from Address 1 and Address 2 of Slot Number 28 of the slots 51a are led around an upper portion of the coil end portions (the return portions 45b and 46b), and the end portions of the first modified conductor segments 47 are abutted and joined together by TIG welding, constituting a third interphase crossover portion $80_{c\text{-}f}$. Hence, a c'-phase winding phase portion (a third connected winding portion) is formed, in which the c-phase winding phase portion and the f-phase winding phase portion are connected in series. The end portions of the first modified conductor segments 47 are welded by abutting together side surfaces constituted by long sides of the rectangular cross sections.

In addition, the first modified conductor segments 47 extending outward at the rear end from Address 3 and Address 4 of Slot Number 14 of the slots 51a, the first modified conductor segments 47 extending outward at the rear end from Address 3 and Address 4 of Slot Number 24 of the slots 51a, and the first modified conductor segments 47 extending outward at the rear end from Address 3 and Address 4 of Slot Number 34 of the slots 51a are led around an upper portion of the coil end portions (the return portions 45b and 46b), and the end portions of the first modified conductor segments 47 are abutted and joined together by TIG welding, constituting a neutral-point connection portion 81. Hence, the stator winding 52 is obtained, which is composed of a three-phase alternating-current winding in which the a'-phase winding phase portion, the b'-phase winding phase portion, and the c'-phase winding phase portion are formed into a Y connection. The end portions of the first modified conductor segments 47 are welded by abutting together side surfaces constituted by long sides of the rectangular cross sections.

The second modified conductor segments 48 extending outward at the rear end from Address 3 and Address 4 of Slot Number 7 of the slots 51a become an output wire Oa' of the a'-phase winding phase portion. The second modified conductor segments 48 extending outward at the rear end from Address 3 and Address 4 of Slot Number 17 of the slots 51a become an output wire Ob' of the b'-phase winding phase portion. And the second modified conductor segments 48 extending outward at the rear end from Address 3 and Address 4 of Slot Number 27 of the slots 51a become an output wire Oc' of the c'-phase winding phase portion.

The stator 50 prepared in this manner is mounted to an automotive alternator, and the output wires Oa', Ob', and Oc' are connected to a single rectifier 12, constituting an electric circuit equivalent to the circuit in FIG. 4.

In Embodiment 2, the interphase crossover portions $80_{a\text{-}d}$, $80_{b\text{-}e}$, and $80_{c\text{-}f}$ are arranged so as to be separated from each other in a circumferential direction. The joint portions of the interphase crossover portions $80_{a\text{-}d}$, $80_{b\text{-}e}$ and $80_{c\text{-}f}$ are also separated in a circumferential direction. The joint portion of the neutral-point connection portion 81 can also be disposed so as to be separated in a circumferential direction from the joint portions of the interphase crossover portions $80_{a\text{-}d}$, $80_{b\text{-}e}$, and $80_{c\text{-}f}$. The neutral-point connection portion 81 is positioned on the upper portion of the coil end portions (the return portions 45b and 46b). Output from the stator winding 52 can be rectified by the single rectifier 12. Consequently, similar effects to those in Embodiment 1 above can also be achieved in Embodiment 2.

According to Embodiment 2, large conductor segments 45 and small conductor segments 46 are used. Thus, at the rear end of the stator core 51, the coil end portions composed of the large and small return portions 45b and 46b are arranged so as to align in rows in a circumferential direction at a pitch of one slot so as to be separated from each other and to form two layers in an axial direction, constituting rear-end coil ends 52r, and at the front end, the coil end portions composed of the joint portions 43 of the free end portions 45c and 46c are arranged so as to align in two rows in a circumferential direction at a pitch of one slot and to be separated from each other and line up in single rows in a radial direction, constituting front-end coil ends 52f. In other words, the stator winding 52 is constructed into an aligned state (an aligned winding) formed by arranging the coil end portions uniformly in a circumferential direction. Hence, the stator winding 52 is cooled by the cooling airflows efficiently, enabling temperature increases in the stator 50 to be suppressed.

Because the joint portions, which are heat-generating portions of the interphase crossover portions $80_{a\text{-}d}$, $80_{b\text{-}e}$, and $80_{c\text{-}f}$ and the neutral-point connection portion 81, are positioned on the upper portion of the coil end portions, heat generated in the joint portions is dissipated by the cooling airflows, suppressing temperature increases in the stator 50.

Because the end portions of the conductor segments 45 and 46 are joined together by TIG welding, contamination by impurities, which is a heat-generating factor, is suppressed. Hence, the amount of heat generated in the joint portions 43 is reduced, suppressing temperature increases in the stator 50.

In the joint portions of the interphase crossover portions and the neutral-point connection portion, because the side surfaces constituted by the long sides of the rectangular cross sections of the modified conductor segments 47 and 48 are placed in close contact and TIG welded, the contact surface area is increased and the shape of the joint portions after welding is spherical, achieving greater bond strength.

In this stator winding 52, because the aligned winding is constituted using lap windings, the conductor wires extending outward at the rear end from Address 1 and Address 2 of the slots 51a are adjacent in a radial direction, and the conductor wires extending outward at the rear end from Address 3 and Address 4 of the slots 51a are adjacent in a radial direction. Thus, the number of turns in the stator winding can be halved by connecting together the conductor wires which are adjacent in a radial direction in the interphase crossover portions and the neutral-point connection portion.

A stator winding having the same number of turns as the stator winding 52 according to Embodiment 2 can be formed regardless of whether or not conductor segments are inserted into Address 1 and Address 4 (or into Address 2 and Address 3) of the slots 51a. Thus, if the conductor segments inserted into Address 1 and Address 4 (or into Address 2 and Address 3) of the slots 51a are omitted, decreases in the performance of the stator can be suppressed and materials costs can be reduced.

Embodiment 3

Figure 11:
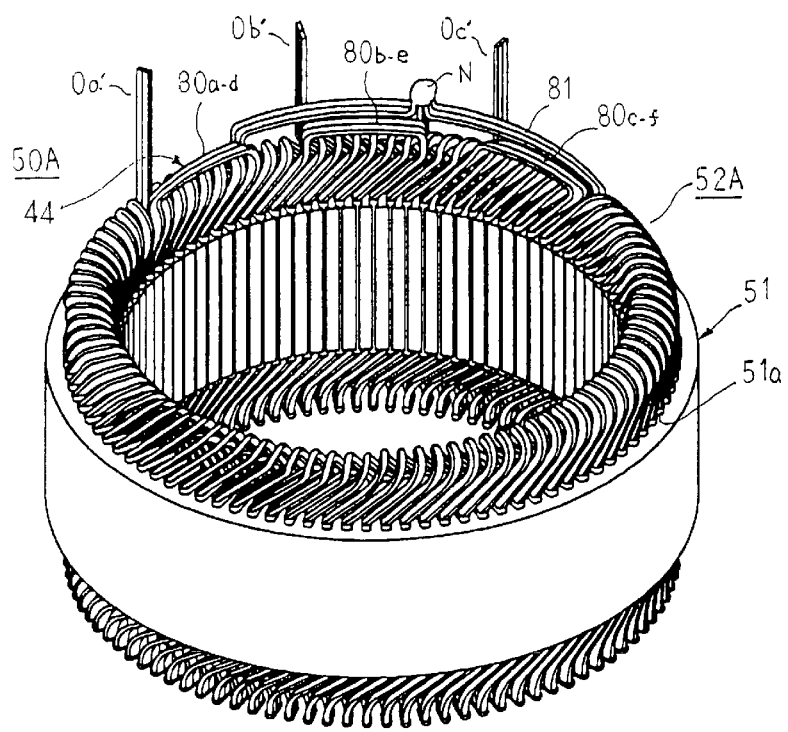
FIG. 11 is a perspective showing a stator of an automotive alternator according to Embodiment 3 of the present invention.

In Embodiment 2 above, the interphase crossover portions $80_{a\text{-}d}$, $80_{b\text{-}e}$ and $80_{c\text{-}f}$ are constructed by joining together the first modified conductor segments 47, but in Embodiment 3, as shown in FIG. 11, the interphase crossover portions $80_{a\text{-}d}$, $80_{b\text{-}e}$, and $80_{c\text{-}f}$ in a stator winding 52A are constituted using third modified conductor segments 44 each constructed by forming one continuous conductor wire coated with an electrical insulator into a shape that is equivalent to the joined and integrated shape of two first modified conductor segments 47.

Consequently, in a stator 50A according to Embodiment 3, because there are no joint portions in the interphase crossover portions $80_{a\text{-}d}$, $80_{b\text{-}e}$, and $80_{c\text{-}f}$, preparation of the stator is facilitated. In addition, because there are no joint portions which are heat-generating portions, temperature increases in the stator are suppressed proportionately and electrical insulation is improved.

Embodiment 4

Figure 12:
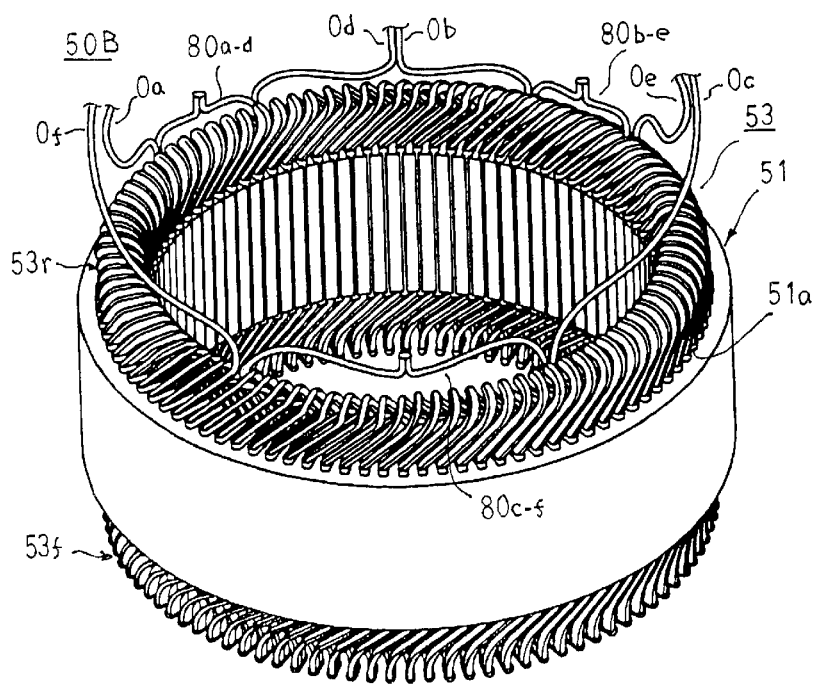
FIG. 12 is a perspective showing a stator of an automotive alternator according to Embodiment 4 of the present invention.
Figure 13:
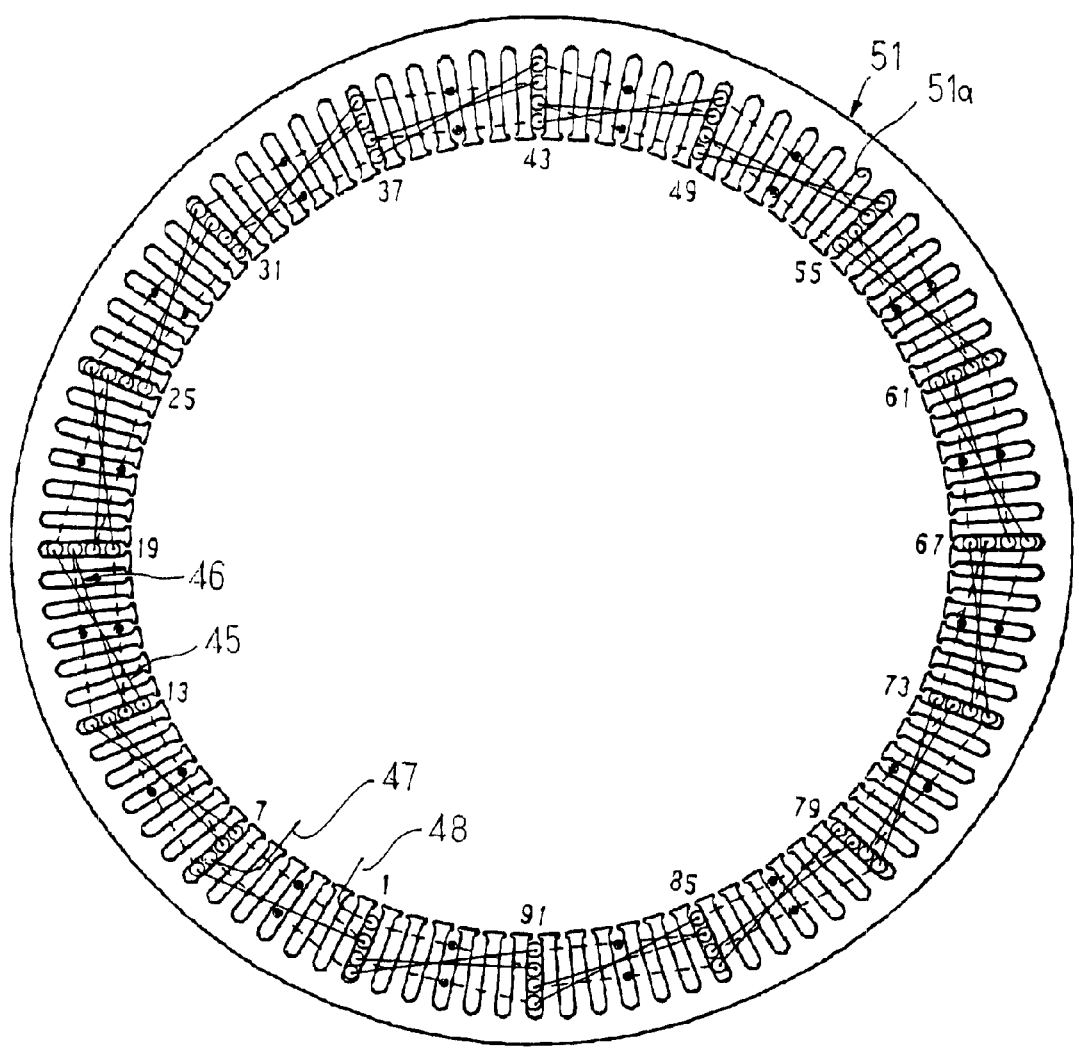
FIG. 13 is a rear end elevation explaining installation of a single winding phase portion constituting a stator winding of the automotive alternator according to Embodiment 4 of the present invention.
Figure 14:
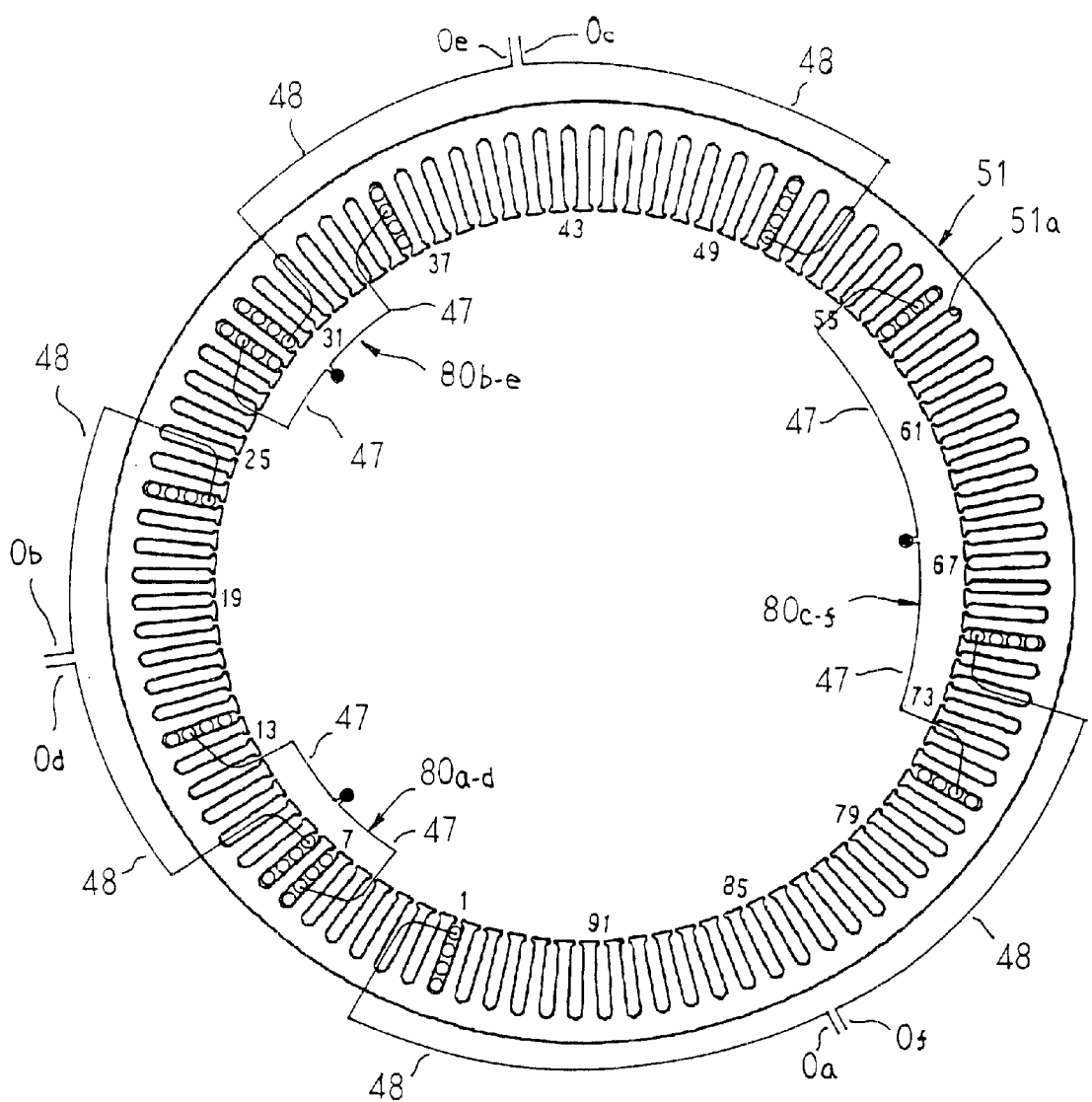
FIG. 14 is a rear end elevation explaining connections in the stator winding in a stator of the automotive alternator according to Embodiment 4 of the present invention.
Figure 15:
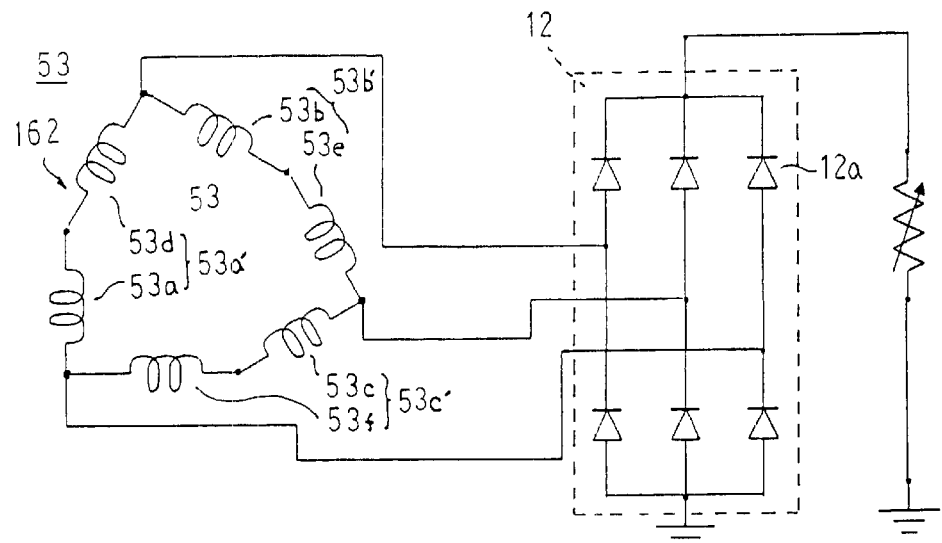
FIG. 15 is a circuit diagram showing an electric circuit in the automotive alternator according to Embodiment 4 of the present invention.

FIG. 12 is a perspective showing a stator of an automotive alternator according to Embodiment 4 of the present invention, FIG. 13 is a rear end elevation explaining installation of a single winding phase portion constituting a stator winding of the automotive alternator according to Embodiment 4 of the present invention, FIG. 14 is a rear end elevation explaining connections in the stator winding in a stator of the automotive alternator according to Embodiment 4 of the present invention, and FIG. 15 is a circuit diagram showing an electric circuit in the automotive alternator according to Embodiment 4 of the present invention. Moreover, in FIG. 13, solid lines indicate rear-end wiring, broken lines indicate front-end wiring, and black circles indicate joint portions.

A construction of a single winding phase portion constituting a stator winding 53 according to Embodiment 4 will be explained with reference to FIG. 13.

First, large conductor segments 45 and small conductor segments 46 are inserted from a rear end of the stator core 51 into slot pairs separated by six slots (slot pairs including Slot Numbers n and (n+6)) in a similar manner to Embodiment 2 above. Then, free end portions of the large conductor segments 45 and the small conductor segments 46 extending outward at the front end from Address 2 and Address 4 of each of the slot pairs are bent in a clockwise direction in FIG. 13, and free end portions of the large conductor segments 45 and the small conductor segments 46 extending outward at the front end from Address 1 and Address 3 of each of the slot pairs are bent in a counterclockwise direction in FIG. 13. Here, four slot-housed portions 45a and 46a are housed in each of the slots 51a so as to line up in one row in a radial direction.

Moreover, in a slot pair including Slot Number 1 of the slots 51a and Slot Number 7 of the slots 51a, a large conductor segment 45 is inserted into Address 3 of Slot Number 1 of the slots 51a and Address 4 of Slot Number 7 of the slots 51a, and first and second modified conductor segments 47 and 48 are inserted into Address 1 of Slot Number 1 of the slots 51a and Address 3 of Slot Number 7 of the slots 51a, respectively. The first modified conductor segment 47 is used as an interphase crossover, and the second modified conductor segment 48 is used as an output wire. As shown in FIG. 14, the insertion addresses of the first and second modified conductor segments 47 and 48 are the same in each of the winding phase portions.

Next, the free end portions 46c of the small conductor segments 46 extending outward at the front end from Address 2 in Slot Number n of the slots 51a and the free end portions 45c of the large conductor segments 45 extending outward at the front end from Address 1 in Slot Number (n+6) of the slots 51a are stacked in a radial direction and joined by TIG welding. Similarly, the free end portions 45c of the large conductor segments 45 extending outward at the front end from Address 4 in Slot Number n of the slots 51a and the free end portions 46c of the small conductor segments 46 extending outward at the front end from Address 3 in Slot Number (n+6) of the slots 51a are stacked in a radial direction and joined by TIG welding. Hence, as shown in FIG. 13, a four-turn lap winding is formed, the lap winding being wound into every sixth slot 51a. This lap winding corresponds to the single winding phase portion.

Moreover, in FIG. 13, only one single winding phase portion is installed in the stator core 51, but in reality, six single winding phase portions installed in this manner are installed such that the slots 51a into which each is inserted are offset by one slot from each other. More specifically, an a-phase winding phase portion 53a is installed in a first slot group including Slot Numbers 1, 7, etc., through 91, a d-phase winding phase portion 53d is installed in a second slot group including Slot Numbers 2, 8, etc., through 92, a c-phase winding phase portion 53c is installed in a third slot group including Slot Numbers 3, 9, etc., through 93, an f-phase winding phase portion 53f is installed in a fourth slot group including Slot Numbers 4, 10, etc., through 94, a b-phase winding phase portion 53b is installed in a fifth slot group including Slot Numbers 5, 11, etc., through 95, and an e-phase winding phase portion 53e is installed in a sixth slot group including Slot Numbers 6, 12, etc., through 96.

The a-phase winding phase portion 53a, the b-phase winding phase portion 53b, and the c-phase winding phase portion 53c have a phase difference corresponding to an electrical angle of 120 degrees from each other, and the d-phase winding phase portion 53d, the e-phase winding phase portion 53e, and the f-phase winding phase portion 53f have a phase difference corresponding to an electrical angle of 120 degrees from each other. The d-phase winding phase portion 53d, the e-phase winding phase portion 53e, and the f-phase winding phase portion 53f have a phase difference corresponding to an electrical angle of 30 degrees relative to the a-phase winding phase portion 53a, the b-phase winding phase portion 53b, and the c-phase winding phase portion 53c, respectively.

An end portion of the second modified conductor segment 48 extending outward at the rear end from Address 1 of Slot Number 1 of the slots 51a and an end portion of the first modified conductor segments 47 extending outward at the rear end from Address 3 of Slot Number 7 of the slots 51a constitute winding ends of the a-phase winding phase portion 53a. An end portion of the second modified conductor segment 48 extending outward at the rear end from Address 1 of Slot Number 8 of the slots 51a and an end portion of the first modified conductor segments 47 extending outward at the rear end from Address 3 of Slot Number 14 of the slots 51a constitute winding ends of the d-phase winding phase portion 53d. An end portion of the second modified conductor segment 48 extending outward at the rear end from Address 1 of Slot Number 23 of the slots 51a and an end portion of the first modified conductor segments 47 extending outward at the rear end from Address 3 of Slot Number 29 of the slots 51a constitute winding ends of the b-phase winding phase portion 53b. An end portion of the second modified conductor segment 48 extending outward at the rear end from Address 1 of Slot Number 30 of the slots 51a and an end portion of the first modified conductor segments 47 extending outward at the rear end from Address 3 of Slot Number 36 of the slots 51a constitute winding ends of the e-phase winding phase portion 53e. An end portion of the second modified conductor segment 48 extending outward at the rear end from Address 1 of Slot Number 51 of the slots 51a and an end portion of the first modified conductor segments 47 extending outward at the rear end from Address 3 of Slot Number 57 of the slots 51a constitute winding ends of the c-phase winding phase portion 53c. And an end portion of the second modified conductor segment 48 extending outward at the rear end from Address 1 of Slot Number 70 of the slots 51a and an end portion of the first modified conductor segments 47 extending outward at the rear end from Address 3 of Slot Number 76 of the slots 51a constitute winding ends of the f-phase winding phase portion 53f.

Next, as shown in FIG. 14, the first modified conductor segment 47 extending outward at the rear end from Address 3 of Slot Number 7 of the slots 51a and the first modified conductor segment 47 extending outward at the rear end from Address 3 of Slot Number 14 of the slots 51a are led around an upper portion of the coil end portions (the return portions 45b and 46b), and the end portions of the first modified conductor segments 47 are abutted and joined together by TIG welding, constituting a first interphase crossover portion $80_{a\text{-}d}$. Hence, an a'-phase winding phase portion 53a' (a first connected winding portion) is formed, in which the a-phase winding phase portion 53a and the d-phase winding phase portion 53d are connected in series. The end portions of the first modified conductor segments 47 are welded by abutting together side surfaces constituted by the long sides of the rectangular cross sections.

The first modified conductor segment 47 extending outward at the rear end from Address 3 of Slot Number 29 of the slots 51a and the first modified conductor segment 47 extending outward at the rear end from Address 3 of Slot Number 36 of the slots 51a are led around an upper portion of the coil end portions (the return portions 45b and 46b), and the end portions of the first modified conductor segments 47 are abutted and joined together by TIG welding, constituting a second interphase crossover portion $80_{b-e}$. Hence, a b'-phase winding phase portion 53b' (a second connected winding portion) is formed, in which the b-phase winding phase portion 53b and the e-phase winding phase portion 53e are connected in series. The end portions of the first modified conductor segments 47 are welded by abutting together side surfaces constituted by the long sides of the rectangular cross sections.

The first modified conductor segment 47 extending outward at the rear end from Address 3 of Slot Number 57 of the slots 51a and the first modified conductor segment 47 extending outward at the rear end from Address 3 of Slot Number 76 of the slots 51a are led around an upper portion of the coil end portions (the return portions 45b and 46b), and the end portions of the first modified conductor segments 47 are abutted and joined together by TIG welding, constituting a third interphase crossover portion $80_{c-f}$. Hence, a c'-phase winding phase portion 53c' (a third connected winding portion) is formed, in which the c-phase winding phase portion 53c and the f-phase winding phase portion 53f are connected in series. The end portions of the first modified conductor segments 47 are welded by abutting together side surfaces constituted by the long sides of the rectangular cross sections.

Hence, the stator winding 53 is obtained, which is composed of a three-phase alternating-current winding 162 in which the a'-phase winding phase portion 53a', the b'-phase winding phase portion 53b', and c'-phase winding phase portion 53c' are formed into a delta connection (an alternating-current connection).

The second modified conductor segments 48 extending outward at the rear end from Address 1 of Slot Number 1 of the slots 51a and Address 1 of Slot Number 8 of the slots 51a become output wires Oa and Od of the a'-phase winding phase portion 53a', respectively. The second modified conductor segments 48 extending outward at the rear end from Address 1 of Slot Number 23 of the slots 51a and Address 1 of Slot Number 30 of the slots 51a become output wires Ob and Oe of the b'-phase winding phase portion 53b', respectively. And the second modified conductor segments 48 extending outward at the rear end from Address 1 of Slot Number 51 of the slots 51a and Address 1 of Slot Number 70 of the slots 51a become output wires Oc and Of of the c'-phase winding phase portion 53c', respectively.

As shown in FIG. 12, in a stator 50B prepared in this manner, the interphase crossover portions $80_{a-d}$, $80_{b-e}$, and $80_{c-f}$ of the stator winding 53 are arranged so as to be dispersed generally uniformly in a circumferential direction without overlapping in a radial direction. This stator 50B is mounted to an automotive alternator, and the output wires Oa, Od, Ob, Oe, Oc, and Of are connected to a single rectifier 12, constituting the electric circuit shown in FIG. 15.

In Embodiment 4, the interphase crossover portions $80_{a-d}$, $80_{b-e}$, and $80_{c-f}$ are arranged so as to be separated from each other in a circumferential direction. The joint portions of the interphase crossover portions $80_{a-d}$, $80_{b-e}$ and $80_{c-f}$ are also separated in a circumferential direction. And output from the stator winding 53 can be rectified by the single rectifier 12. Consequently, similar effects to those in Embodiment 2 above can also be achieved in Embodiment 4.

According to Embodiment 4, because the a'-phase winding phase portion 53a', the b'-phase winding phase portion 53b', and the c'-phase winding phase portion 53c' are formed into a delta connection, the need for a neutral-point connection portion is eliminated, facilitating preparation of the stator and simplifying the coil ends, thereby improving electrical insulation.

Because the interphase crossover portions $80_{a-d}$, $80_{b-e}$, and $80_{c-f}$ are arranged so as to be dispersed generally uniformly in a circumferential direction, ventilation balance in the upper portion of the coil end portions is improved, suppressing temperature increases in the stator.

Moreover, at the rear end of the stator core 51, the coil end portions composed of the large and small return portions 45b and 46b are arranged so as to align in rows in a circumferential direction at a pitch of one slot so as to be separated from each other and to form two layers in an axial direction, constituting rear-end coil ends 53r, and at the front end, the coil end portions composed of the joint portions 43 of the free end portions 45c and 46c are arranged so as to align in two rows in a circumferential direction at a pitch of one slot and to be separated from each other and line up in single rows in a radial direction, constituting front-end coil ends 53f. In other words, because the stator winding 53 is constructed into an aligned state (an aligned winding) formed by arranging the coil end portions uniformly in a circumferential direction in a similar manner to Embodiment 2 above, similar effects to Embodiment 2 above can be achieved.

Embodiment 5

Figure 16:
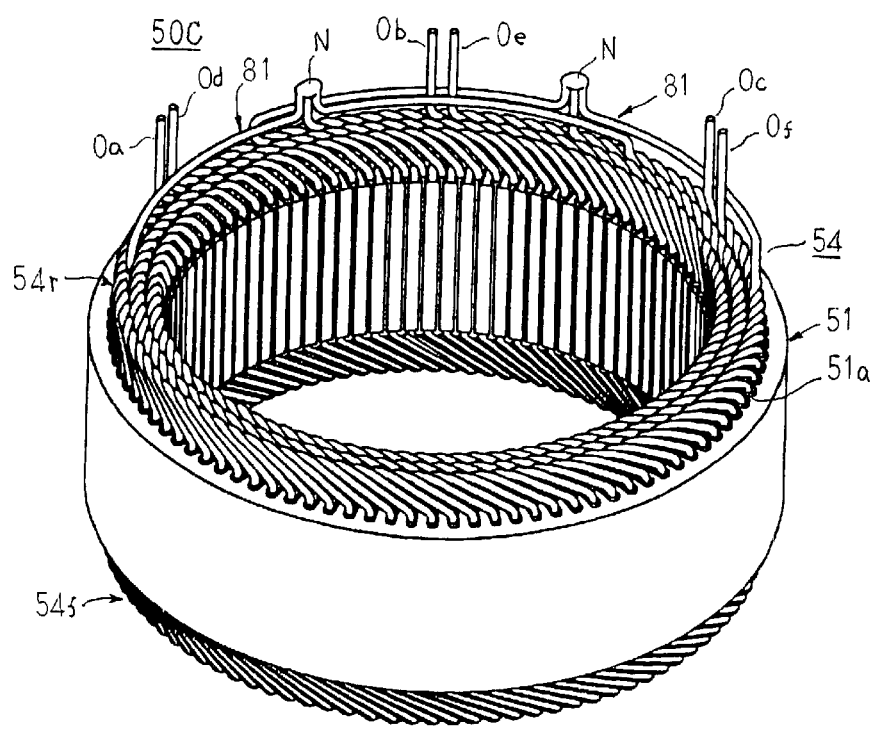
FIG. 16 is a perspective showing a stator of an automotive alternator according to Embodiment 5 of the present invention.
Figure 17:
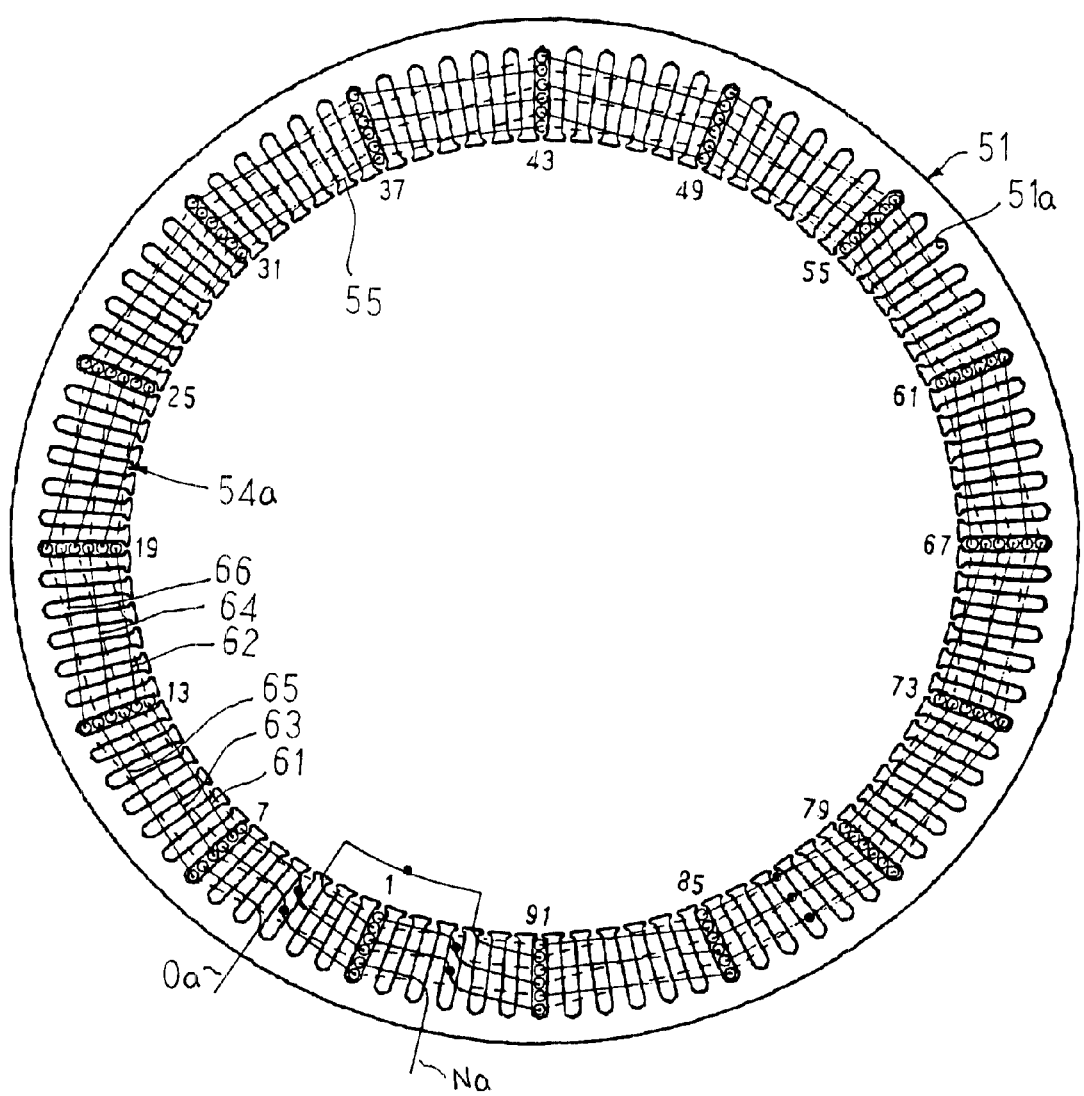
FIG. 17 is a rear end elevation explaining installation of a single winding phase portion constituting a stator winding of the automotive alternator according to Embodiment 5 of the present invention.
Figure 18:
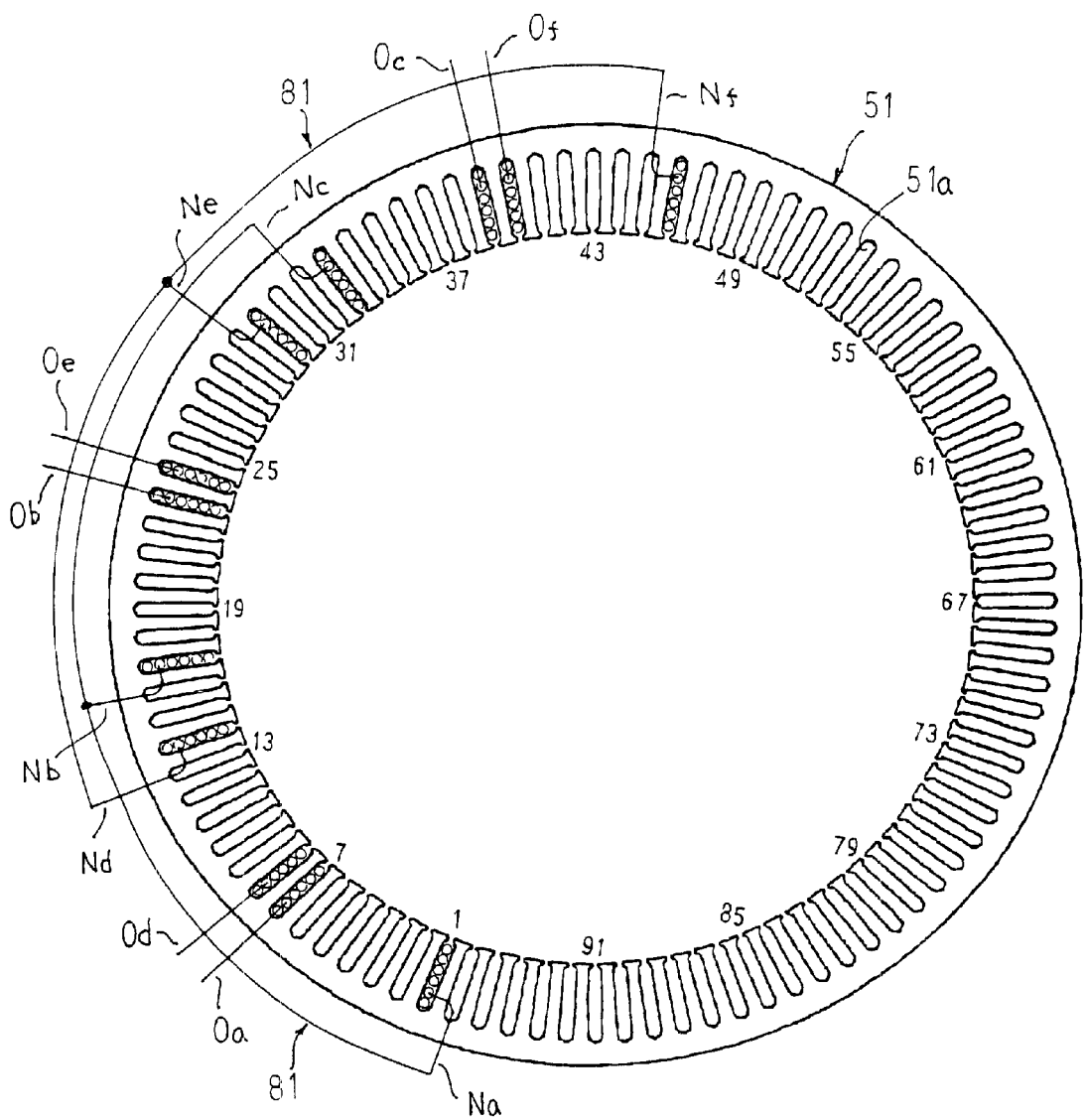
FIG. 18 is a rear end elevation explaining connections in the stator winding in a stator of the automotive alternator according to Embodiment 5 of the present invention.
Figure 19A:
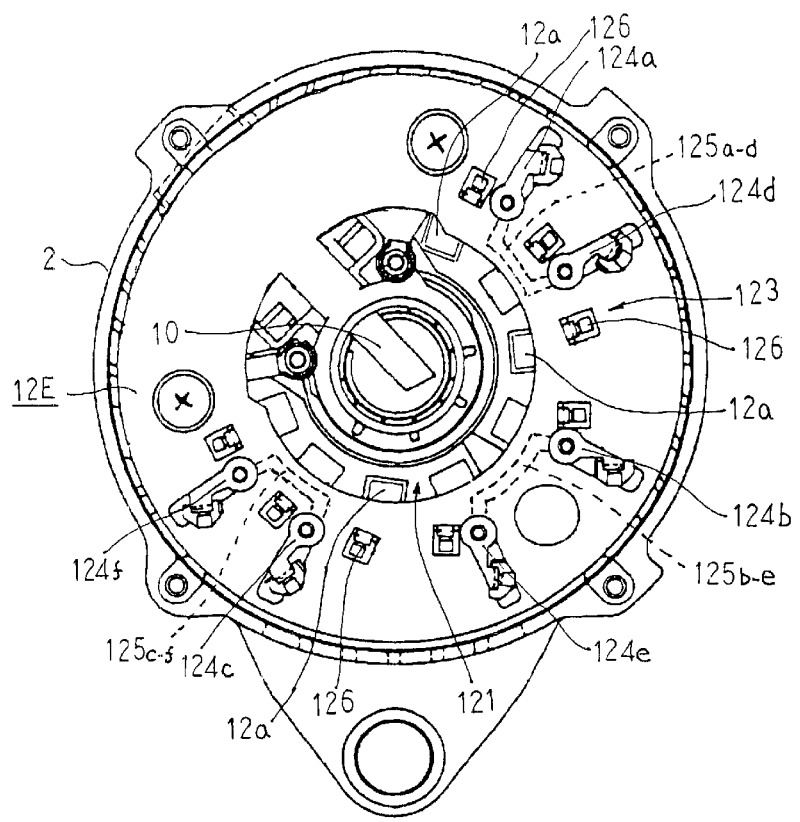
FIG. 19A is an end elevation showing a rectifier in which interphase crossover portions of the stator winding are constructed in the stator of the automotive alternator according to Embodiment 5 of the present invention.
Figure 19B:
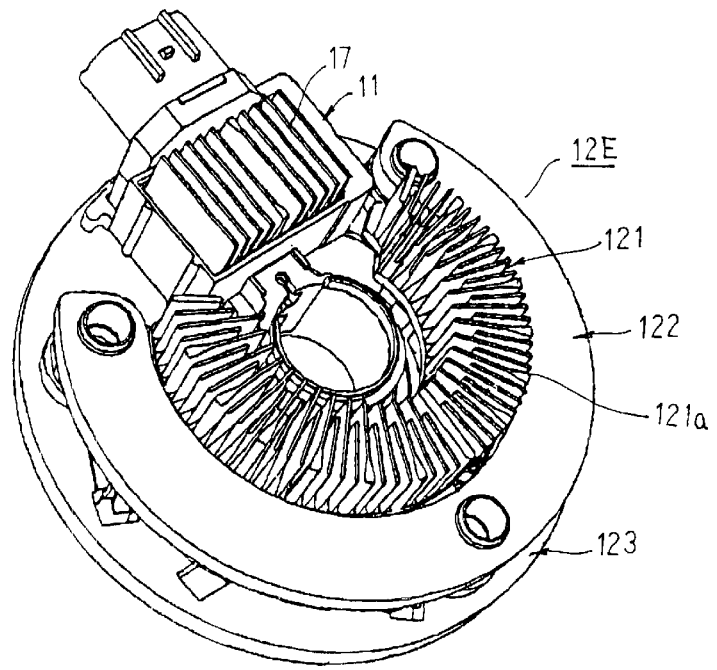
FIG. 19B is a perspective showing the rectifier in which the interphase crossover portions of the stator winding are constructed in the stator of the automotive alternator according to Embodiment 5 of the present invention.
Figure 20:
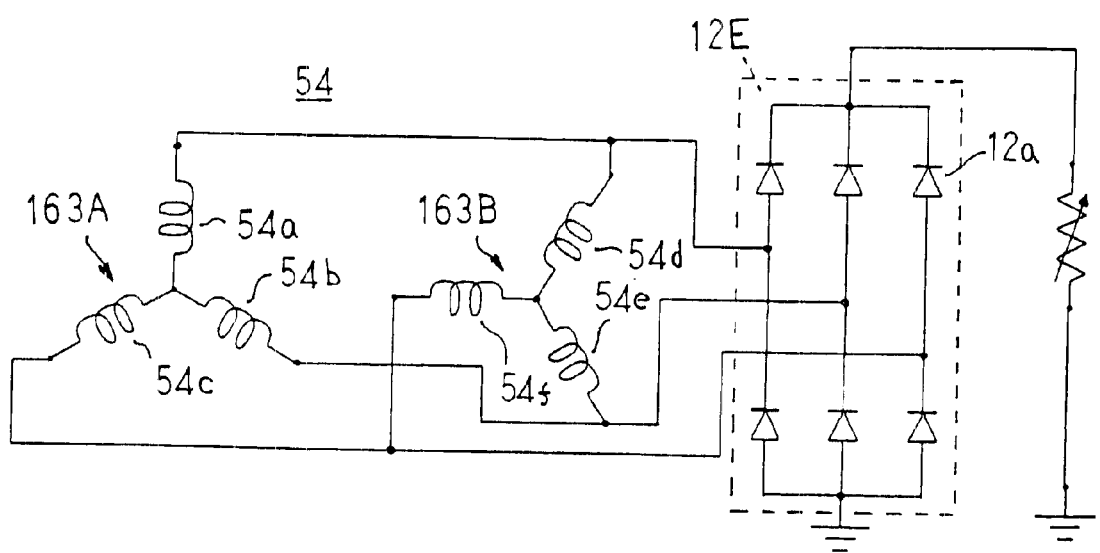
FIG. 20 is a circuit diagram showing an electric circuit in the automotive alternator according to Embodiment 5 of the present invention.

FIG. 16 is a perspective showing a stator of an automotive alternator according to Embodiment 5 of the present invention, FIG. 17 is a rear end elevation explaining installation of a single winding phase portion constituting a stator winding of the automotive alternator according to Embodiment 5 of the present invention, FIG. 18 is a rear end elevation explaining connections in the stator winding in a stator of the automotive alternator according to Embodiment 5 of the present invention, FIG. 19A is an end elevation showing a rectifier in which interphase crossover portions of the stator winding are constructed in the stator of the automotive alternator according to Embodiment 5 of the present invention, FIG. 19B is a perspective showing the rectifier in which the interphase crossover portions of the stator winding are constructed in the stator of the automotive alternator according to Embodiment 5 of the present invention, and FIG. 20 is a circuit diagram showing an electric circuit in the automotive alternator according to Embodiment 5 of the present invention. Moreover, in FIG. 17, solid lines indicate rear-end wiring, broken lines indicate front-end wiring, and black circles indicate joint portions.

A construction of a single winding phase portion constituting a stator winding 54 according to Embodiment 5 will be explained with reference to FIG. 17.

An a-phase winding phase portion 54a is constituted by first to sixth winding sub-portions 61 to 66 each composed of one conductor wire 55 composed of a continuous copper wire having a rectangular cross section coated with an electrical insulator. The first winding sub-portion 61 is constructed by wave winding one conductor wire 55 so as to alternately occupy Address 1 and Address 2 in every sixth slot 15a from Slot Numbers 1 to 91. The second winding sub-portion 62 is constructed by wave winding one conductor wire 55 so as to alternately occupy Address 2 and Address 1 in every sixth slot 15a from Slot Numbers 1 to 91. The third winding sub-portion 63 is constructed by wave winding one conductor wire 55 so as to alternately occupy Address 3 and Address 4 in every sixth slot 15a from Slot Numbers 1 to 91. The fourth winding sub-portion 64 is constructed by wave winding one conductor wire 55 so as to alternately occupy Address 4 and Address 3 in every sixth slot 15a from Slot Numbers 1 to 91. The fifth winding sub-portion 65 is constructed by wave winding one conductor wire 55 so as to alternately occupy Address 5 and Address 6 in every sixth slot 15a from Slot Numbers 1 to 91. The sixth winding sub-portion 66 is constructed by wave winding one conductor wire 55 so as to alternately occupy Address 6 and Address 5 in every sixth slot 15a from Slot Numbers 1 to 91. In each of the slots 51a, six conductor wires 55 are arranged so as to line up in one row in a radial direction with longitudinal axes of their rectangular cross sections aligned radially.

Moreover, the first to sixth winding sub-portions 61 to 66 are each formed into single-turn wave windings by joining together first and second ends of the conductor wires 55. The second winding sub-portion 62, the fourth winding sub-portion 64, and the sixth winding sub-portion 66 are offset by an electrical angle of 180 degrees and inversely wound relative to the first winding sub-portion 61, the third winding sub-portion 63, and the fifth winding sub-portion 65, respectively.

At the rear end of the stator core 51, portions of the conductor wires 55 of the first, third, and fifth winding sub-portions 61, 63, and 65 extending outward from Slot Number 91 and Slot Number 1 of the slots 51a are cut, and portions of the conductor wires 55 of the second, fourth, and sixth winding sub-portions 62, 64, and 66 extending outward from Slot Number 1 and Slot Number 7 of the slots 51a are cut. Next, the cut end of the third winding sub-portion 63 extending outward from Address 4 of Slot Number 91 of the slots 51a, and the cut end of the first winding sub-portion 61 extending outward from Address 1 of Slot Number 1 of the slots 51a are joined together. The cut end of the fifth winding sub-portion 65 extending outward from Address 6 of Slot Number 91 of the slots 51a, and the cut end of the third winding sub-portion 63 extending outward from Address 3 of Slot Number 1 of the slots 51a are joined together. The cut end of the fourth winding sub-portion 64 extending outward from Address 4 of Slot Number 1 of the slots 51a, and the cut end of the second winding sub-portion 62 extending outward from Address 1 of Slot Number 7 of the slots 51a are joined together. The cut end of the sixth winding sub-portion 66 extending outward from Address 6 of Slot Number 1 of the slots 51a, and the cut end of the fourth winding sub-portion 64 extending outward from Address 3 of Slot Number 7 of the slots 51a are joined together. And the cut end of the first winding sub-portion 61 extending outward from Address 2 of Slot Number 91 of the slots 51a, and the cut end of the second winding sub-portion 62 extending outward from Address 2 of Slot Number 1 of the slots 51a are joined together. Hence, a six-turn wave winding (the a-phase winding phase portion 54a) is formed, in which the first to sixth winding sub-portions 61 to 66 are connected in series. In this a-phase winding phase portion 54a, the cut end of the fifth winding sub-portion 65 extending outward from Address 5 of Slot Number 1 of the slots 51a becomes a neutral-point lead wire (Na), and the cut end of the sixth winding sub-portion 66 extending outward from Address 5 of Slot Number 7 of the slots 51a becomes an output wire (Oa).

A d-phase winding phase portion 54d, a c-phase winding phase portion 54c, an f-phase winding phase portion 54f, a b-phase winding phase portion 54b, and an e-phase winding phase portion 54e are formed in a similar manner such that the slot groups into which the conductor wires 55 of each winding phase portion are installed are successively offset by one slot from each other.

Moreover, the a-phase winding phase portion 54a is installed in a first slot group including Slot Numbers 1, 7, etc., through 91, the d-phase winding phase portion 54d is installed in a second slot group including Slot Numbers 2, 8, etc., through 92, the c-phase winding phase portion 54c is installed in a third slot group including Slot Numbers 3, 9, etc., through 93, the f-phase winding phase portion 54f is installed in a fourth slot group including Slot Numbers 4, 10, etc., through 94, the b-phase winding phase portion 54b is installed in a fifth slot group including Slot Numbers 5, 11, etc., through 95, and the e-phase winding phase portion 54e is installed in a sixth slot group including Slot Numbers 6, 12, etc., through 96. The d-phase winding phase portion 54d, the e-phase winding phase portion 54e, and the f-phase winding phase portion 54f have a phase difference corresponding to an electrical angle of 30 degrees relative to the a-phase winding phase portion 54a, the b-phase winding phase portion 54b, and the c-phase winding phase portion 54c, respectively.

Next, as shown in FIG. 18, the neutral-point lead wire (Na) of the a-phase winding phase portion 54a extending outward from Address 5 of Slot Number 1 of the slots 51a, the neutral-point lead wire (Nb) of the b-phase winding phase portion 54b extending outward from Address 5 of Slot Number 17 of the slots 51a, and the neutral-point lead wire (Nc) of the c-phase winding phase portion 54c extending outward from Address 5 of Slot Number 33 of the slots 51a are led around an upper portion of the coil end portions, and the end portions thereof are abutted and joined together by TIG welding, constituting a neutral-point connection portion 81. Hence, the a-phase winding phase portion 54a, the b-phase winding phase portion 54b, and the c-phase winding phase portion 54c are formed into a Y connection, constituting a first three-phase alternating-current winding 163A. Moreover, each of the end portions are welded by abutting together side surfaces constituted by long sides of the rectangular cross sections.

Similarly, the neutral-point lead wire (Nd) of the d-phase winding phase portion 54d extending outward from Address 5 of Slot Number 14 of the slots 51a, the neutral-point lead wire (Ne) of the e-phase winding phase portion 54e extending outward from Address 5 of Slot Number 30 of the slots 51a, and the neutral-point lead wire (Nf) of the f-phase winding phase portion 54f extending outward from Address 5 of Slot Number 46 of the slots 51a are led around an upper portion of the coil end portions, and the end portions thereof are abutted and joined together by TIG welding, constituting a neutral-point connection portion 81. Hence, the d-phase winding phase portion 54d, the e-phase winding phase portion 54e, and the f-phase winding phase portion 54f are formed into a Y connection, constituting a second three-phase alternating-current winding 163B. Moreover, each of the end portions are welded by abutting together side surfaces constituted by the long sides of the rectangular cross sections.

A stator 50C is constructed by installing the stator winding 54 composed of the first and second three-phase alternating-current windings 163A and 163B in the stator core 51, as shown in FIG. 16. The output wire Oa of the a-phase winding phase portion 54a and the output wire Od of the d-phase winding phase portion 54d extend outward in an axial direction in close proximity. The output wire Ob of the b-phase winding phase portion 54b and the output wire Oe of the e-phase winding phase portion 54e extend outward in an axial direction in close proximity. And the output wire Oc of the c-phase winding phase portion 54c and the output wire Of of the f-phase winding phase portion 54f extend outward in an axial direction in close proximity.

This stator 50C is mounted to an automotive alternator, the output wires Oa and Od being gathered together, the output wires Ob and Oe being gathered together, the output wires Oc and Of being gathered together, and all being connected to a single rectifier 12E. Hence, as shown in FIG. 20, an electric circuit is constructed in which the first and second three-phase alternating-current winding 163A and 163B are connected to the single rectifier 12E in parallel.

A construction of the rectifier 12E will now be explained with reference to FIGS. 19A and 19B.

A positive-side cooling plate 121 is formed into a horseshoe shape, three diodes 12a being disposed on a major surface so as to have a predetermined spacing in a circumferential direction. Heat-dissipating fins 121a are disposed so as to stand in a radial pattern on a back surface (a surface on the opposite side from the major surface). A negative-side cooling plate 122 is also formed into a horseshoe shape, three diodes 12a being disposed on a major surface thereof so as to have a predetermined spacing in a circumferential direction.

A circuit board 123 is constructed by insert molding into a resin first to sixth connection terminals 124a, 124d, 124b, 124e, 124c, and 124f, a first crossover conductor $125_{a-d}$ linking between the first and fourth connection terminals 124a and 124d, a second crossover conductor $125_{b-e}$ linking between the second and fifth connection terminals 124b and 124e, a third crossover conductor $125_{c-f}$ linking between the third and sixth connection terminals 124c and 124f, diode-linking terminals 126, etc. Moreover, a brush holder 11 is formed integrally with the circuit board 123. The first, second, and third connection terminals 124a, 124b, and 124c are connected to each of the diode-linking terminals 126 by insert conductors (not shown).

The positive-side and negative-side cooling plates 121 and 122 are disposed coaxially such that their respective major surfaces are positioned on a plane which is perpendicular to the shaft 6, the circuit board 123 being disposed so as to overlap the major surfaces of the positive-side and negative-side cooling plates 121 and 122. Here, each of the diodes 12a disposed on the major surface of the positive-side cooling plate 121 are disposed radially opposite each of the diodes 12a disposed on the major surface of the negative-side cooling plate 122. The connection terminals of each of the radially-opposite pairs of diodes 12a are connected to the respective diode-linking terminals 126 of the circuit board 123, constituting three diode bridges, as shown in FIG. 20.

The first to sixth connection terminals 124a, 124d, 124b, 124e, 124c, and 124f and the first to third crossover conductors $125_{a-d}$, $125_{b-e}$, and $125_{c-f}$ described above correspond to connection members of each of the interphase crossover portions. The first to sixth connection terminals 124a, 124d, 124b, 124e, 124c, and 124f are disposed so as to match up with the outlet positions of the output wires Oa, Od, Ob, Oe, Oc, and Of, being disposed so as to be offset in a circumferential direction so as not overlap radially with the diodes 12a.

Then, the a-phase and d-phase output wires Oa and Od, which are drawn straight up in an axial direction from the rear-end coil ends, are securely fastened to the first and fourth connection terminals 124a and 124d, respectively, by attaching a mounting terminal having a mounting aperture (not shown) to the tip of each and passing a mounting screw (not shown) through the mounting aperture. The b-phase and e-phase output wires Ob and Oe, which are drawn straight up in an axial direction from the rear-end coil ends, are securely fastened to the second and fifth connection terminals 124b and 124e, respectively, by attaching a mounting terminal having a mounting aperture (not shown) to the tip of each and passing a mounting screw (not shown) through the mounting aperture. And the c-phase and f-phase output wires Oc and Of, which are drawn straight up in an axial direction from the rear-end coil ends, are securely fastened to the third and sixth connection terminals 124c and 124f, respectively, by attaching a mounting terminal having a mounting aperture (not shown) to the tip of each and passing a mounting screw (not shown) through the mounting aperture. Hence, the first and second three-phase alternating-current winding 163A and 163B are connected to the single rectifier 12E. Moreover, the interphase crossover portion between the a-phase winding phase portion 54a and the d-phase winding phase portion 54d is constituted by the a-phase and d-phase output wires Oa and Od, the first and fourth connection terminals 124a and 124d, and the first crossover conductor $125_{a-d}$, the interphase crossover portion between the b-phase winding phase portion 54b and the e-phase winding phase portion 54e is constituted by the b-phase and e-phase output wires Ob and Oe, the second and fifth connection terminals 124b and 124e, and the second crossover conductor $125_{b-e}$, and the interphase crossover portion between the c-phase winding phase portion 54c and the f-phase winding phase portion 54f is constituted by the c-phase and f-phase output wires Oc and Of, the third and sixth connection terminals 124c and 124f, and the third crossover conductor $125_{c-f}$.

Figure 21:
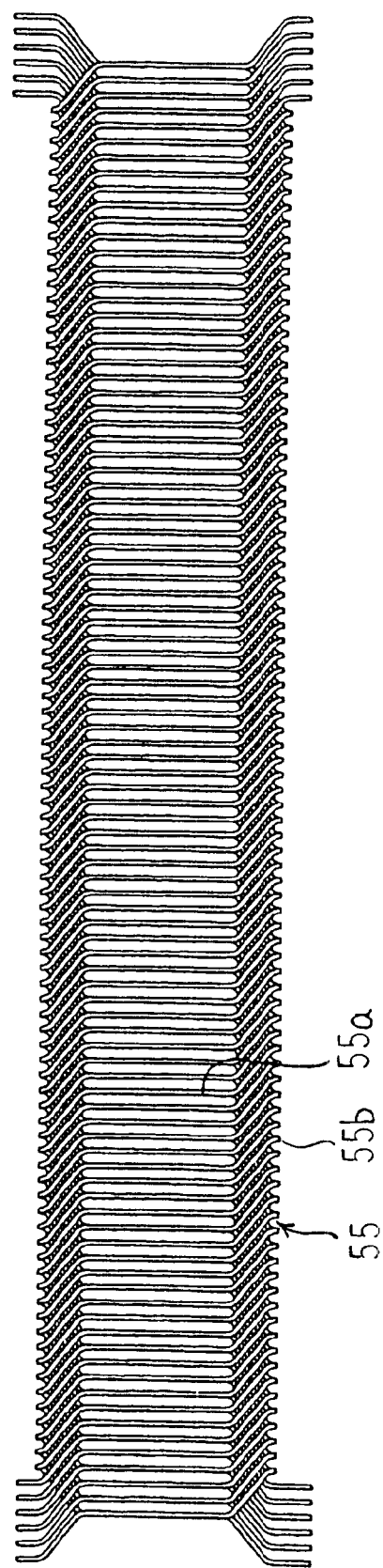
FIG. 21 is a plan showing a winding assembly constituting the stator winding used in the stator for the automotive alternator according to Embodiment 5 of the present invention.

Now, the stator winding 54 can be constructed using the winding assembly 56 shown in FIG. 21.

This winding assembly 56 is prepared by simultaneously folding twelve conductor wires 55 arranged parallel to each other at a pitch of one slot into a lightning shape on a common plane.

Figure 22:
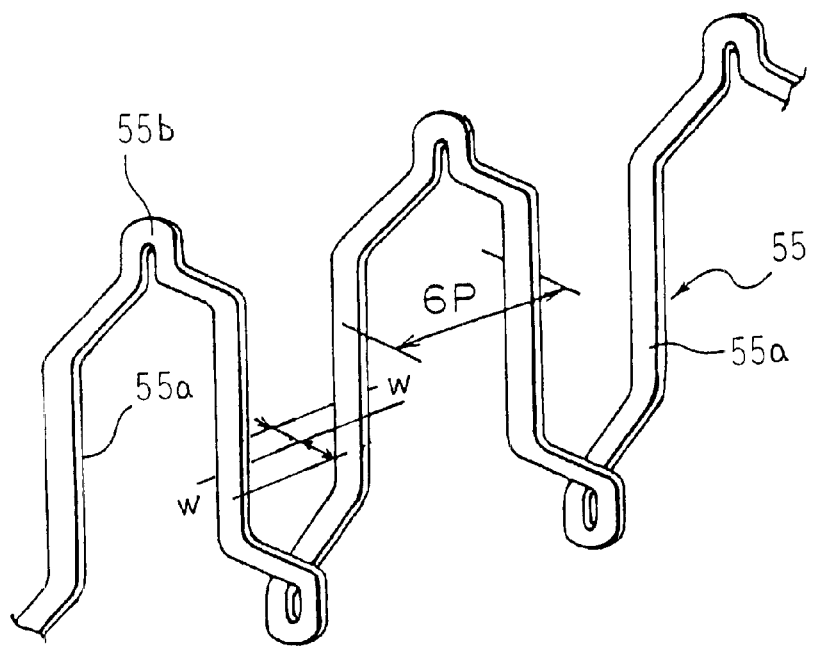
FIG. 22 is a perspective explaining part of a conductor wire constituting the winding assembly shown in FIG. 21.

As shown in FIG. 22, each of the conductor wires 55 folded into the lightning shape is shaped by bending into a planar pattern in which straight slot-housed portions 55a joined by return portions 55b are arranged at a pitch of six slots (6P). Adjacent pairs of the slot-housed portions 55a are offset by the return portions 55b by a width (w) of the conductor wires 55.

Figure 23:
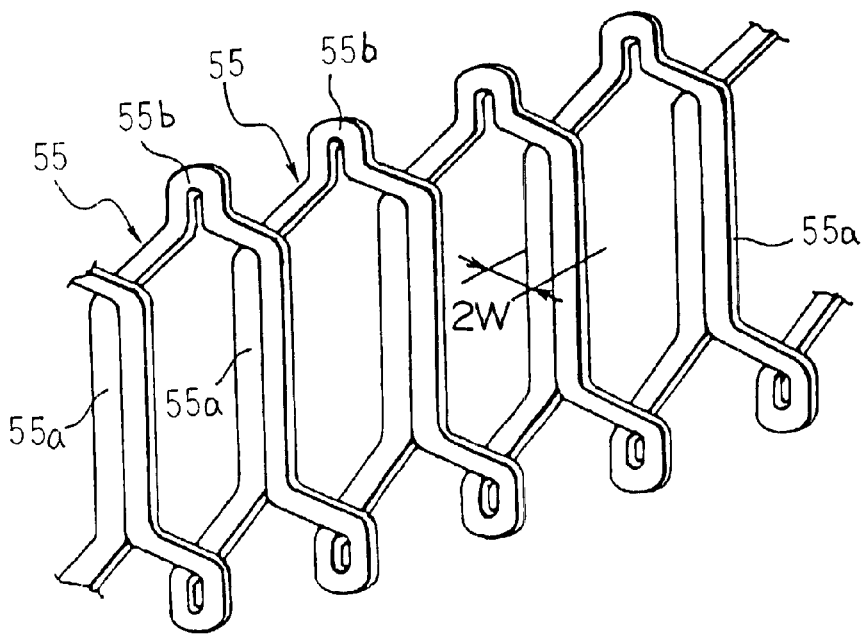
FIG. 23 is a perspective explaining arrangement of conductor wires constituting the winding assembly shown in FIG. 21.

Six pairs of conductor wires 55 in each of which two of the conductor wires 55 shaped by bending in this manner are offset by a pitch of six slots with slot-housed portions 55a stacked as shown in FIG. 23 are arranged so as to be offset by a pitch of one slot from each other to constitute the winding assembly 56.

Three winding assemblies 56 constructed in this manner are stacked in three layers and mounted to the stator core 51. Each of the conductor wires 55 is installed so as to alternately occupy an inner layer and an outer layer in a slot depth direction in the slots 51a in every sixth slot, constituting the first to sixth winding sub-portions 61 to 66 in FIG. 17. The a-phase winding phase portion 54a, the b-phase winding phase portion 54b, the c-phase winding phase portion 54c, the d-phase winding phase portion 54d, the e-phase winding phase portion 54e, and the f-phase winding phase portion 54f composed of a six-turn wave winding in which the first to sixth winding sub-portions 61 to 66 are connected in series are constructed by making connections based on the connection method shown in FIG. 17. In addition, the stator winding 54 is constructed by making connections based on the connection method shown in FIG. 18.

In the stator 50C prepared in this manner, each of the interphase crossover portions of the stator winding 54 are arranged so as to be dispersed in a circumferential direction without overlapping in a radial direction. And output from the stator winding 54 can be rectified by the single rectifier 12E. Consequently, similar effects to those in Embodiment 2 above can also be achieved in Embodiment 5.

According to Embodiment 5, because the first to sixth connection terminals 124a, 124d, 124b, 124e, 124c, and 124f of each of the interphase crossover portions are formed on the rectifier 12E so as to correspond to the outlet positions of the output wires Oa, Od, Ob, Oe, Oc, and Of, ventilation resistance in the upper portion of the coil end portions of the stator winding 54 is reduced, increasing the cooling airflow rate. Hence, cooling of the stator winding 54 is improved. It is also no longer necessary to bend and shape the conductor wires 55 constituting the output wires Oa, Od, Ob, Oe, Oc, and Of in order to form each of the interphase crossover portions, thereby improving assembly of the stator. In addition, the present embodiment can also easily be adapted to specifications in which the first and second three-phase alternating-current windings 163A and 163B are rectified by separate rectifiers.

Because the first to sixth connection terminals 124a, 124d, 124b, 124e, 124c, and 124f are offset in a circumferential direction so as not overlap with the diodes 12a of the rectifier 12E radially, heat from the diodes 12a is less likely to be transferred to the first to sixth connection terminals 124a, 124d, 124b, 124e, 124c, and 124f by the cooling airflows, thereby suppressing temperature increases in the stator winding 54.

Because the stator winding 54 is constituted by the winding assemblies 56, at first and second ends of the stator core 51, return portions 55b (coil end portions) formed into a uniform shape are separated from each other in a radial direction and circumferential direction and arranged neatly so as to form three rows in a circumferential direction at a pitch of one slot and be stacked in single rows in a radial direction, constituting the front-end and rear-end coil ends 54f and 54r, which are in an aligned state. Consequently, the stator winding 54 is an aligned winding, achieving similar effects to Embodiment 2 above.

Because the stator winding 54 is prepared using conductor wires 55 of continuous wire, the number of joints is significantly reduced compared to Embodiment 2 above in which short conductor segments are used, significantly improving electrical insulation and also improving cooling of the stator.

Moreover, in Embodiments 2 to 5 above, stator windings prepared using conductor wires having a rectangular cross section have been explained, but similar effects are also exhibited using stator windings prepared using conductor wires having a circular cross section. In that case, cooling of the interphase crossover portions is improved because the cooling airflows flow smoothly. In addition, damage to the electrically-insulating coating resulting from contact among the conductor wires is suppressed, thereby improving electrical insulation.

Moreover, each Embodiment above has been explained for cases in which the d-phase winding phase portion, the e-phase winding phase portion, and the f-phase winding phase portion have a phase difference corresponding to an electrical angle of 30 degrees relative to the a-phase winding phase portion, the b-phase winding phase portion, and the c-phase winding phase portion, respectively, but the electrical angle α degrees of the phase difference between the corresponding winding phase portions is not limited to 30 degrees, the electrical angle α degrees may be in the range from 25 degrees to 35 degrees.

The present invention is constructed in the above manner and exhibits the effects described below.

As explained above, according to one aspect of the present invention, there is provided according to one aspect of the present invention, there is provided an automotive alternator including:

a stator having:
an annular stator core in which slots are disposed at a ratio of two per phase per pole; and
a stator winding mounted to the stator core,
wherein the stator winding is provided with six winding phase portions each installed in a slot group including every sixth slot of the slots such that each of the slot groups is successively offset by one slot,
each pair of the six winding phase portions having a phase difference corresponding to an electrical angle of approximately 30 degrees is connected by an interphase crossover portion, and
the interphase crossover portions are arranged so as to be separated in an axial direction from coil ends of the stator winding and so as to be offset in a circumferential direction so as not to overlap each other in a radial direction, thereby providing an automotive alternator in which cooling and electrical insulation of the stator is improved and wind noise is reduced.

The stator winding may be constructed into a single three-phase alternating-current winding by forming three connected winding portions into a Y connection, each of the connected winding portions being formed by connecting a pair of the winding phase portions having a phase difference corresponding to an electrical angle of approximately 30 degrees by means of the interphase crossover portions, enabling high output to be achieved by extracting output from a neutral point N.

The stator winding may be constituted by first and second three-phase alternating-current windings in each of which three of the winding phase portions having a phase difference corresponding to an electrical angle of 120 degrees are formed into a Y connection, the first and second three-phase alternating-current windings being constructed in parallel by connecting pairs of the winding phase portions having a phase difference corresponding to an electrical angle of approximately 30 degrees by means of the interphase crossover portions, enabling the present invention to be easily adapted from specifications in which output from a stator winding is rectified by a single rectifier to specifications in which output from the stator winding is rectified by two (first and second) rectifiers.

The stator winding may be constructed into a single three-phase alternating-current winding by forming three connected winding portions into a delta connection, each of the connected winding portions being formed by connecting a pair of the winding phase portions having a phase difference corresponding to an electrical angle of approximately 30 degrees by means of the interphase crossover portions, eliminating the need for connection of a neutral point and simplifying coil ends, thereby improving electrical insulation.

The interphase crossover portions may be constituted by continuous conductor wires coated with an electrical insulator, eliminating the need for a joining operation and improving electrical insulation.

The interphase crossover portions may be constituted by:
conductor wires drawn in an axial direction from the winding phase portions; and
a connection member connecting the conductor wires at a position separated in an axial direction from the coil ends, eliminating an operation of shaping the conductor wires in which the conductor wires are bent so as to extend along the coil ends in a circumferential direction.

The automotive alternator may include a rectifier for converting alternating current from the stator into direct current, the connection member being formed integrally in the rectifier so as not to overlap with a diode constituting the rectifier relative to a radial direction, whereby heat from the diode is not transferred to the connection member by means of a cooling airflow, thereby suppressing temperature increases in the stator.

The interphase crossover portions may have a joint portion formed by joining together end portions of conductor wires drawn from the winding phase portions, the joint portion being positioned in a ventilation channel for a cooling airflow above the coil ends, exposing the joint portion, which is a heat-generating portion, to the cooling airflow, thereby suppressing temperature increases in the stator.

End portions of the conductor wires may be formed with a rectangular cross section, the end portions of the conductor wires being joined by bringing side surfaces constituted by long sides of the rectangular cross sections into close contact with each other, achieving greater bond strength.

A neutral point constituting the three-phase alternating-current windings may be constituted by a joint portion formed by joining together end portions of conductor wires drawn from the winding phase portions, the joint portion being positioned in a ventilation channel for a cooling airflow above the coil ends, exposing the joint portion, which is a heat-generating portion, to the cooling airflow, thereby suppressing temperature increases in the stator.

The joint portion may be formed by TIG welding, increasing bond strength in the joint portion.

The interphase crossover portions may be disposed so as to be dispersed generally uniformly in a circumferential direction, whereby ventilation balance of the cooling airflow is superior, thereby suppressing temperature increases in the stator.

Coil ends of the stator may be constructed in an aligned state in which coil end portions of the winding phase portions are arranged uniformly in a circumferential direction, whereby the coil ends are cooled efficiently, thereby suppressing temperature increases in the stator.

The winding phase portions may be constructed by linking together a large number of short conductor segments, enabling the coil ends to be easily constructed in an aligned state.

The winding phase portions may be constituted by a plurality of wave windings in each of which one continuous conductor wire is installed so as to alternately occupy an inner layer and an outer layer in every sixth slot of the slots, significantly reducing the number of joints in the coil ends, thereby improving cooling efficiency in the coil ends.

The winding phase portions may be constituted by conductor wires having a circular cross section, whereby the cooling airflows flow smoothly, enabling temperature increases in the stator to be suppressed, and damage to the electrically-insulating coating due to contact among the conductor wires is suppressed, improving electrical insulation.

The winding phase portions may be connected in parallel by connecting radially-adjacent pairs of conductor wires at winding ends, enabling the number of turns in the winding phase portions to be easily halved.

What is claimed is:

1. An automotive alternator comprising:

a stator having:
      an annular stator core in which slots are disposed at a ratio of two per phase per pole; and
      a stator winding mounted to said stator core, wherein said stator winding is provided with six winding phase portions each installed in a slot group including every sixth slot of said slots such that each of said slot groups is successively offset by one slot, each pair of said six winding phase portions having a phase difference corresponding to an electrical angle of approximately 30 degrees is connected by an interphase crossover portion, and said interphase crossover portions are arranged so as to be separated in an axial direction from coil ends of said stator winding and so as to be offset in a circumferential direction so as not to overlap each other in a radial direction.

2. The automotive alternator according to claim 1 wherein said stator winding is constructed into a single three-phase alternating-current winding by forming three connected winding portions into a Y connection, each of said connected winding portions being formed by connecting a pair of said winding phase portions having a phase difference corresponding to an electrical angle of approximately 30 degrees by means of said interphase crossover portions.

3. The automotive alternator according to claim 2 wherein a neutral point constituting said three-phase alternating-current winding is constituted by a joint portion formed by joining together end portions of conductor wires drawn from said winding phase portions, said joint portion being positioned in a ventilation channel for a cooling airflow above said coil ends.

4. The automotive alternator according to claim 1 wherein said stator winding is constituted by first and second three-phase alternating-current windings in each of which three of said winding phase portions having a phase difference corresponding to an electrical angle of 120 degrees are formed into a Y connection, said first and second three-phase alternating-current windings being constructed in parallel by connecting pairs of said winding phase portions having a phase difference corresponding to an electrical angle of approximately 30 degrees by means of said interphase crossover portions.

5. The automotive alternator according to claim 4 wherein each neutral point constituting said first and second three-phase alternating-current windings is constituted by a joint portion formed by joining together end portions of conductor wires drawn from said winding phase portions, said joint portions being positioned in a ventilation channel for a cooling airflow above said coil ends.

6. The automotive alternator according to claim 1 wherein said stator winding is constructed into a single three-phase alternating-current winding by forming three connected winding portions into a delta connection, each of said connected winding portions being formed by connecting a pair of said winding phase portions having a phase difference corresponding to an electrical angle of approximately 30 degrees by means of said interphase crossover portions.

7. The automotive alternator according to claim 1 wherein said interphase crossover portions are constituted by continuous conductor wires coated with an electrical insulator.

8. The automotive alternator according to claim 1 wherein said interphase crossover portions are constituted by:
   conductor wires drawn in an axial direction from said winding phase portions; and
   a connection member connecting said conductor wires at a position separated in an axial direction from said coil ends.

9. The automotive alternator according to claim 8, further comprising a rectifier for converting alternating current from said stator into direct current, wherein said connection member is formed integrally in said rectifier so as not to overlap with a diode constituting said rectifier relative to a radial direction.

10. The automotive alternator according to claim 1 wherein said interphase crossover portions have a joint portion formed by joining together end portions of conductor wires drawn from said winding phase portions, said joint portion being positioned in a ventilation channel for a cooling airflow above said coil ends.

11. The automotive alternator according to claim 10 wherein end portions of said conductor wires are formed with a rectangular cross section, said end portions of said conductor wires being joined by bringing side surfaces constituted by long sides of said rectangular cross sections into close contact with each other.

12. The automotive alternator according to claim 10 wherein said joint portion is formed by TIG welding.

13. The automotive alternator according to claim 1 wherein said interphase crossover portions are disposed so as to be dispersed generally uniformly in a circumferential direction.

14. The automotive alternator according to claim 1 wherein coil ends of said stator are constructed in an aligned state in which coil end portions of said winding phase portions are arranged uniformly in a circumferential direction.

15. The automotive alternator according to claim 14 wherein said winding phase portions are constructed by linking together a large number of short conductor segments.

16. The automotive alternator according to claim 14 wherein said winding phase portions are constituted by a plurality of wave windings in each of which one continuous conductor wire is installed so as to alternately occupy an inner layer and an outer layer in every sixth slot of said slots.

17. The automotive alternator according to claim 14 wherein said winding phase portions are constituted by conductor wires having a circular cross section.

18. The automotive alternator according to claim 14 wherein said winding phase portions are connected in parallel by connecting radially-adjacent pairs of conductor wires at winding ends.

* * * * *